US012720108B2

(12) United States Patent
Li et al.

(10) Patent No.: US 12,720,108 B2
(45) Date of Patent: Aug. 25, 2026

(54) OVERLAPPED BLOCK MOTION COMPENSATION (OBMC) FOR INTRA MODE

(71) Applicant: Alibaba (China) Co., Ltd., Hangzhou (CN)

(72) Inventors: Xinwei Li, Beijing (CN); Ru-ling Liao, Sunnyvale, CA (US); Jie Chen, Beijing (CN); Yan Ye, San Diego, CA (US)

(73) Assignee: Alibaba (China) Co., Ltd., Hangzhou (CN)

( * ) Notice: Subject to any disclaimer, the term of this patent is extended or adjusted under 35 U.S.C. 154(b) by 0 days.

(21) Appl. No.: 18/748,757

(22) Filed: Jun. 20, 2024

(65) Prior Publication Data

US 2025/0008153 A1 Jan. 2, 2025

Related U.S. Application Data

(60) Provisional application No. 63/511,661, filed on Jul. 2, 2023.

(51) Int. Cl.

*H04N 19/583* (2014.01)
*H04N 19/159* (2014.01)
*H04N 19/176* (2014.01)

(52) U.S. Cl.

CPC ......... *H04N 19/583* (2014.11); *H04N 19/159* (2014.11); *H04N 19/176* (2014.11)

(58) Field of Classification Search

CPC .. H04N 19/583; H04N 19/159; H04N 19/176; H04N 19/105; H04N 19/11; H04N 19/593

See application file for complete search history.

(56) References Cited

U.S. PATENT DOCUMENTS

2020/0244956 A1* 7/2020 Lee ...................... H04N 19/124
2023/0283770 A1* 9/2023 Chang .................. H04N 19/583 375/240.16

FOREIGN PATENT DOCUMENTS

CN 111131822 A 5/2020
WO 2020140915 A1 7/2020
WO 2023043296 A1 3/2023
WO 2023072216 A1 5/2023

OTHER PUBLICATIONS

"Requirements for a Future Video Coding Standard v5," International Organisation for Standardisation, Torino, IT, 14 pages (2017).
Sullivan et al., "Overview of the High Efficiency Video Coding (HEVC) Standard," IEE Transactions on Circuits and Systems for Video Technology, vol. 22, No. 12, pp. 1649-1668 (2012).
Jem, https://jvet.hhi.fraunhofer.de/svn/svn_HMJEMSoftware.

(Continued)

*Primary Examiner* — Nam D Pham

(74) *Attorney, Agent, or Firm* — Finnegan, Henderson, Farabow, Garrett & Dunner, LLP

(57) ABSTRACT

A method for processing video includes receiving a bitstream; and decoding, using coded information of the bitstream, one or more pictures. The decoding includes performing overlapped block motion compensation (OBMC) on a block predicted with an intra mode.

13 Claims, 19 Drawing Sheets

(56) References Cited

OTHER PUBLICATIONS

Chen et al., "Algorithm Description of Joint Exploration Test Model 7 (JEM 7)," JVET-G1001-v1, 7th Meeting: Torino, IT, Jul. 13-21, 2017, 50 pages.

International Telecommunications Union "Series H: Audiovisual and Multimedia Systems Infrastructure of audiovisual services—Coding of moving video", ITU-T Telecommunication Standardization Sector of ITU, Apr. 2013, 317 pages.

PCT International Search Report and Written Opinion mailed Aug. 22, 2024, issued in corresponding International Application No. PCT/CN2024/102723 (7 pgs.).

* cited by examiner 720
710
721
723
Curr
703

OVERLAPPED BLOCK MOTION COMPENSATION (OBMC) FOR INTRA MODE

CROSS-REFERENCE TO RELATED APPLICATIONS

The disclosure claims the benefits of priority to U.S. Provisional Application No. 63/511,661, filed Jul. 2, 2023, which is incorporated herein by reference in its entirety.

TECHNICAL FIELD

The present disclosure generally relates to video processing, and more particularly, to methods and apparatuses for performing overlapped block motion compensation (OBMC) for intra mode.

BACKGROUND

A video is a set of static pictures (or "frames") capturing the visual information. To reduce the storage memory and the transmission bandwidth, a video can be compressed before storage or transmission and decompressed before display. The compression process is usually referred to as encoding and the decompression process is usually referred to as decoding. There are various video coding formats which use standardized video coding technologies, most commonly based on prediction, transform, quantization, entropy coding and in-loop filtering. The video coding standards, such as the High Efficiency Video Coding (HEVC/H.265) standard, the Versatile Video Coding (VVC/H.266) standard, and AVS standards, specifying the specific video coding formats, are developed by standardization organizations. With more and more advanced video coding technologies being adopted in the video standards, the coding efficiency of the new video coding standards get higher and higher.

SUMMARY OF THE DISCLOSURE

Embodiments of the present disclosure provide a method for processing video. The method includes receiving a bitstream; and decoding, using coded information of the bitstream, one or more pictures. The decoding includes performing overlapped block motion compensation (OBMC) on a block predicted with an intra mode.

Embodiments of the present disclosure provide a method of encoding a video sequence into a bitstream. The method includes receiving a video sequence; encoding one or more pictures of the video sequence; and generating a bitstream. The encoding includes performing overlapped block motion compensation (OBMC) on a block predicted with an intra mode.

Embodiments of the present disclosure provide a non-transitory computer-readable storage medium storing a bitstream of a video for processing according to operations. The operation comprises performing overlapped block motion compensation (OBMC) on a block predicted with an intra mode.

BRIEF DESCRIPTION OF THE DRAWINGS

Embodiments and various aspects of the present disclosure are illustrated in the following detailed description and the accompanying figures. Various features shown in the figures are not drawn to scale.

DETAILED DESCRIPTION

Figure 1:
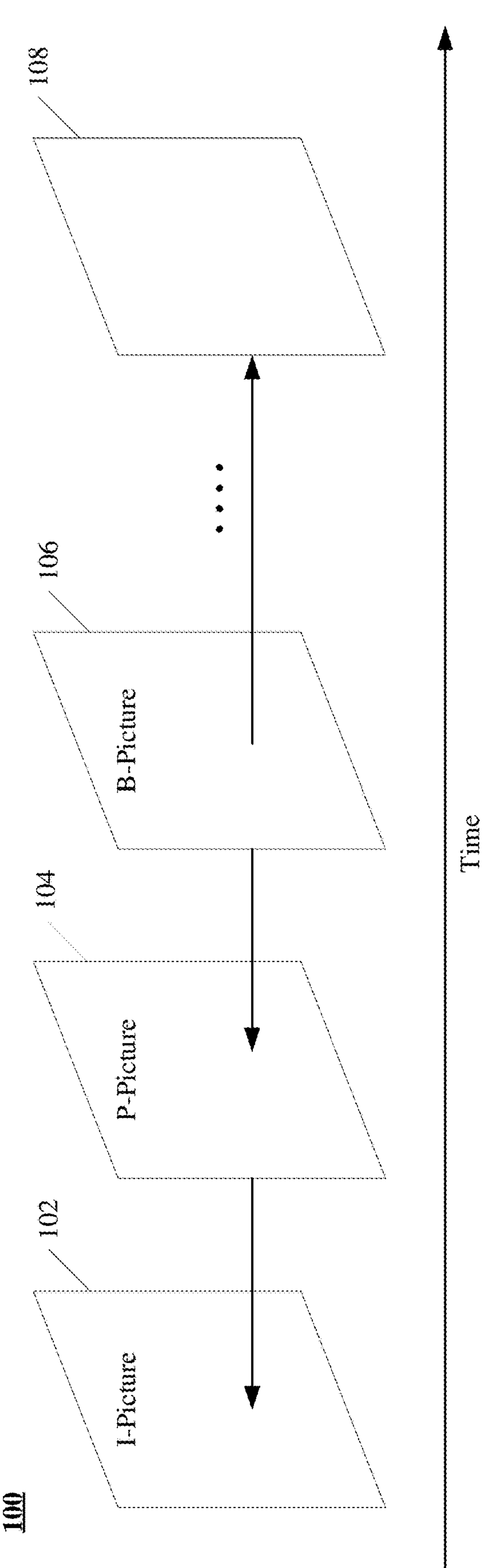
FIG. 1 is a schematic diagram illustrating structures of an example video sequence, according to some embodiments of the present disclosure.
Figure 1:
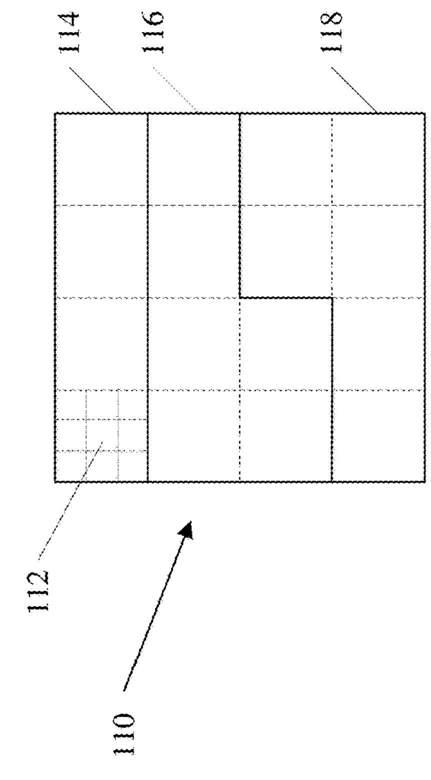

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims. Particular aspects of the present disclosure are described in greater detail below. The terms and definitions provided herein control, if in conflict with terms and/or definitions incorporated by reference.

The Joint Video Experts Team (JVET) of the ITU-T Video Coding Expert Group (ITU-T VCEG) and the ISO/IEC Moving Picture Expert Group (ISO/IEC MPEG) is currently developing the Versatile Video Coding (VVC/H.266) standard. The VVC standard is aimed at doubling the compression efficiency of its predecessor, the High Efficiency Video Coding (HEVC/H.265) standard. In other words, VVC's goal is to achieve the same subjective quality as HEVC/H.265 using half the bandwidth.

To achieve the same subjective quality as HEVC/H.265 using half the bandwidth, the JVET has been developing technologies beyond HEVC using the joint exploration model (JEM) reference software. As coding technologies were incorporated into the JEM, the JEM achieved substantially higher coding performance than HEVC.

The VVC standard has been developed recent, and continues to include more coding technologies that provide better compression performance. VVC is based on the same hybrid video coding system that has been used in modern video compression standards such as HEVC, H.264/AVC, MPEG2, H.263, etc.

A video is a set of static pictures (or "frames") arranged in a temporal sequence to store visual information. A video capture device (e.g., a camera) can be used to capture and store those pictures in a temporal sequence, and a video playback device (e.g., a television, a computer, a smartphone, a tablet computer, a video player, or any end-user terminal with a function of display) can be used to display such pictures in the temporal sequence. Also, in some applications, a video capturing device can transmit the captured video to the video playback device (e.g., a computer with a monitor) in real-time, such as for surveillance, conferencing, or live broadcasting.

For reducing the storage space and the transmission bandwidth needed by such applications, the video can be compressed before storage and transmission and decompressed before the display. The compression and decompression can be implemented by software executed by a processor (e.g., a processor of a generic computer) or specialized hardware. The module for compression is generally referred to as an "encoder," and the module for decompression is generally referred to as a "decoder." The encoder and decoder can be collectively referred to as a "codec." The encoder and decoder can be implemented as any of a variety of suitable hardware, software, or a combination thereof. For example, the hardware implementation of the encoder and decoder can include circuitry, such as one or more microprocessors, digital signal processors (DSPs), application-specific integrated circuits (ASICs), field-programmable gate arrays (FPGAs), discrete logic, or any combinations thereof. The software implementation of the encoder and decoder can include program codes, computer-executable instructions, firmware, or any suitable computer-implemented algorithm or process fixed in a computer-readable medium. Video compression and decompression can be implemented by various algorithms or standards, such as MPEG-1, MPEG-2, MPEG-4, H.26x series, or the like. In some applications, the codec can decompress the video from a first coding standard and re-compress the decompressed video using a second coding standard, in which case the codec can be referred to as a "transcoder."

The video encoding process can identify and keep useful information that can be used to reconstruct a picture and disregard unimportant information for the reconstruction. If the disregarded, unimportant information cannot be fully reconstructed, such an encoding process can be referred to as "lossy." Otherwise, it can be referred to as "lossless." Most encoding processes are lossy, which is a tradeoff to reduce the needed storage space and the transmission bandwidth.

The useful information of a picture being encoded (referred to as a "current picture") include changes with respect to a reference picture (e.g., a picture previously encoded and reconstructed). Such changes can include position changes, luminosity changes, or color changes of the pixels, among which the position changes are mostly concerned. Position changes of a group of pixels that represent an object can reflect the motion of the object between the reference picture and the current picture.

A picture coded without referencing another picture (i.e., it is its own reference picture) is referred to as an "I-picture" or "I-slice" A picture is referred to as a "P-picture" or "P-slice" if some or all blocks (e.g., blocks that generally refer to portions of the video picture) in the picture are predicted using intra prediction or inter prediction with one reference picture (e.g., uni-prediction). A picture is referred to as a "B-picture" or "B-slice" if at least one block in it is predicted with two reference pictures (e.g., bi-prediction).

FIG. 1 illustrates structures of an example video sequence 100, according to some embodiments of the present disclosure. Video sequence 100 can be a live video or a video having been captured and archived. Video 100 can be a real-life video, a computer-generated video (e.g., computer game video), or a combination thereof (e.g., a real-life video with augmented-reality effects). Video sequence 100 can be inputted from a video capture device (e.g., a camera), a video archive (e.g., a video file stored in a storage device) containing previously captured video, or a video feed interface (e.g., a video broadcast transceiver) to receive video from a video content provider.

As shown in FIG. 1, video sequence 100 can include a series of pictures arranged temporally along a timeline, including pictures 102, 104, 106, and 108. Pictures 102-106 are continuous, and there are more pictures between pictures 106 and 108. In FIG. 1, picture 102 is an I-picture, the reference picture of which is picture 102 itself. Picture 104 is a P-picture, the reference picture of which is picture 102, as indicated by the arrow. Picture 106 is a B-picture, the reference pictures of which are pictures 104 and 108, as indicated by the arrows. In some embodiments, the reference picture of a picture (e.g., picture 104) can be not immediately preceding or following the picture. For example, the reference picture of picture 104 can be a picture preceding picture 102. It should be noted that the reference pictures of pictures 102-106 are only examples, and the present disclosure does not limit embodiments of the reference pictures as the examples shown in FIG. 1.

Typically, video codecs do not encode or decode an entire picture at one time due to the computing complexity of such tasks. Rather, they can split the picture into basic segments, and encode or decode the picture segment by segment. Such basic segments are referred to as basic processing units ("BPUs") in the present disclosure. For example, structure 110 in FIG. 1 shows an example structure of a picture of video sequence 100 (e.g., any of pictures 102-108). In structure 110, a picture is divided into 4×4 basic processing units, the boundaries of which are shown as dash lines. In some embodiments, the basic processing units can be referred to as "macroblocks" in some video coding standards (e.g., MPEG family, H.261, H.263, or H.264/AVC), or as "coding tree units" ("CTUs") in some other video coding standards (e.g., H.265/HEVC or H.266/VVC). The basic processing units can have variable sizes in a picture, such as 128×128, 64×64, 32×32, 16×16, 4×8, 16×32, or any arbitrary shape and size of pixels. The sizes and shapes of the basic processing units can be selected for a picture based on the balance of coding efficiency and levels of details to be kept in the basic processing unit.

The basic processing units can be logical units, which can include a group of different types of video data stored in a computer memory (e.g., in a video frame buffer). For example, a basic processing unit of a color picture can include a luma component (Y) representing achromatic brightness information, one or more chroma components (e.g., Cb and Cr) representing color information, and associated syntax elements, in which the luma and chroma components can have the same size of the basic processing unit. The luma and chroma components can be referred to as "coding tree blocks" ("CTBs") in some video coding standards (e.g., H.265/HEVC or H.266/VVC). Any operation performed to a basic processing unit can be repeatedly performed to each of its luma and chroma components.

Video coding has multiple stages of operations, examples of which are shown in FIGS. 2A-2B and FIGS. 3A-3B. For each stage, the size of the basic processing units can still be too large for processing, and thus can be further divided into segments referred to as "basic processing sub-units" in the present disclosure. In some embodiments, the basic processing sub-units can be referred to as "blocks" in some video coding standards (e.g., MPEG family, H.261, H.263, or H.264/AVC), or as "coding units" ("CUs") in some other video coding standards (e.g., H.265/HEVC or H.266/VVC). A basic processing sub-unit can have the same or smaller size than the basic processing unit. Similar to the basic processing units, basic processing sub-units are also logical units, which can include a group of different types of video data (e.g., Y, Cb, Cr, and associated syntax elements) stored in a computer memory (e.g., in a video frame buffer). Any operation performed to a basic processing sub-unit can be repeatedly performed to each of its luma and chroma components. It should be noted that such division can be performed to further levels depending on processing needs. It should also be noted that different stages can divide the basic processing units using different schemes.

Figure 2A:
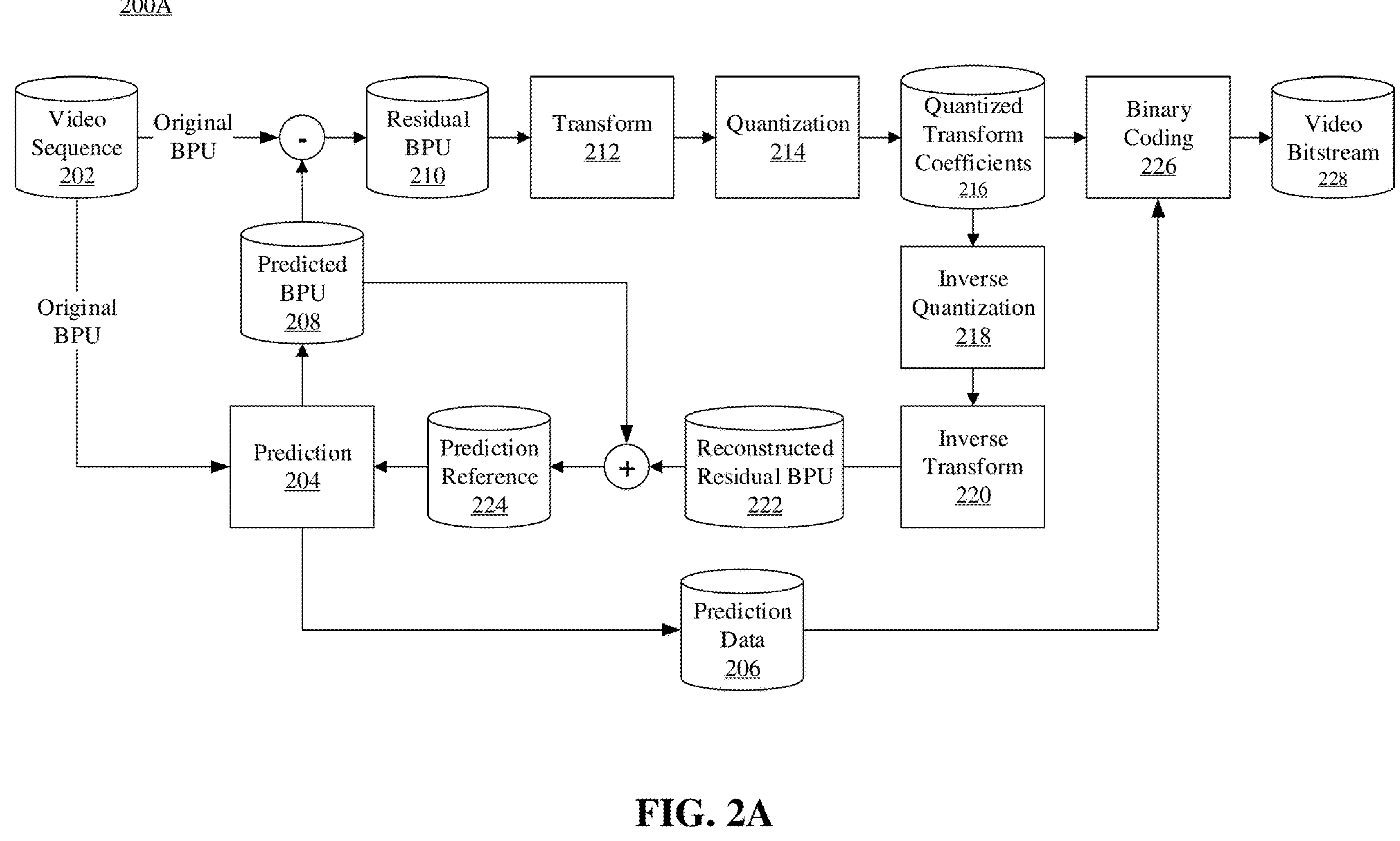
FIG. 2A is a schematic diagram illustrating an exemplary encoding process of a hybrid video coding system, consistent with embodiments of the disclosure.
Figure 2B:
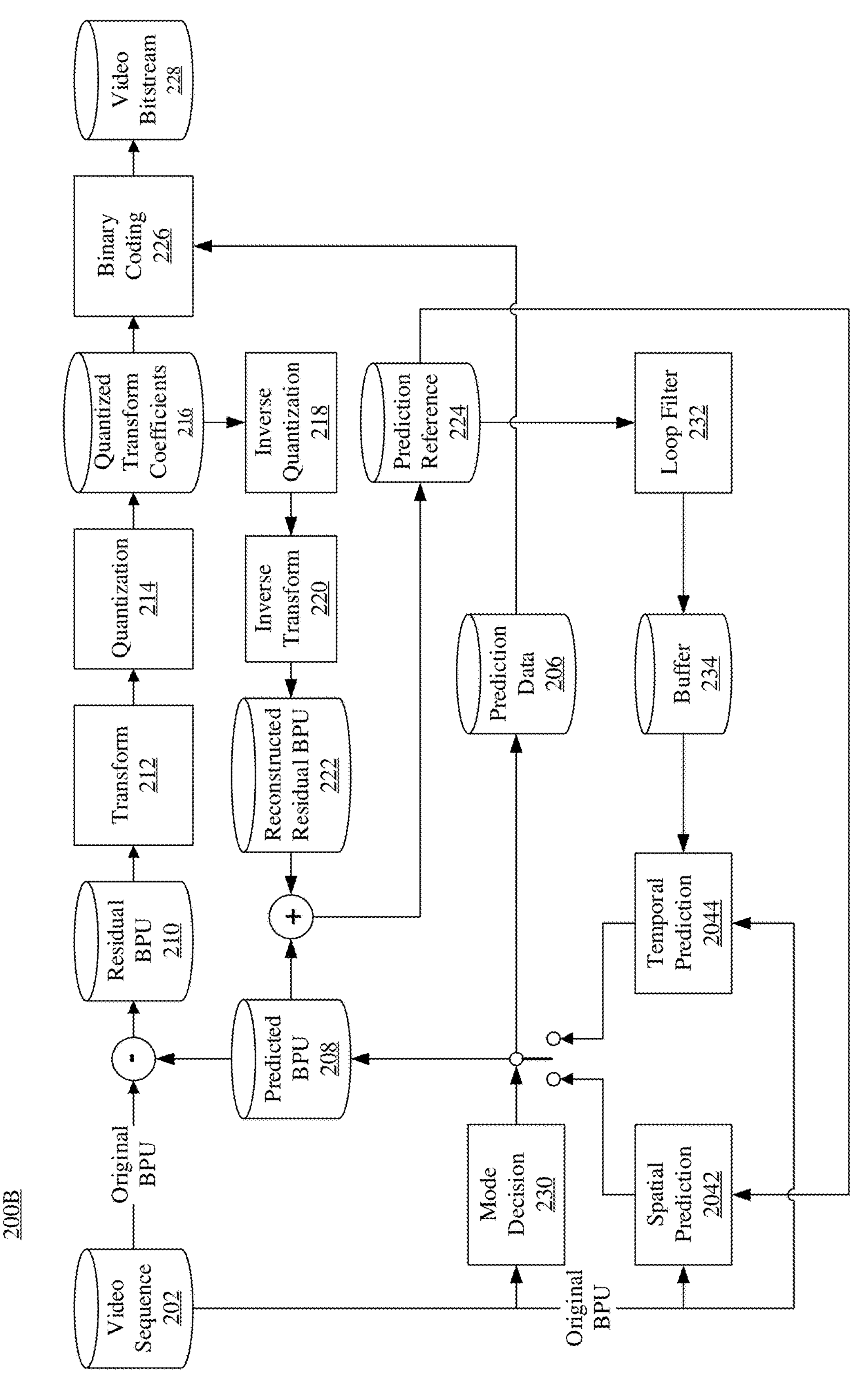
FIG. 2B is a schematic diagram illustrating another exemplary encoding process of a hybrid video coding system, consistent with embodiments of the disclosure.

For example, at a mode decision stage (an example of which is shown in FIG. 2B), the encoder can decide what prediction mode (e.g., intra-picture prediction or inter-picture prediction) to use for a basic processing unit, which can be too large to make such a decision. The encoder can split the basic processing unit into multiple basic processing sub-units (e.g., CUs as in H.265/HEVC or H.266/VVC), and decide a prediction type for each individual basic processing sub-unit.

For another example, at a prediction stage (an example of which is shown in FIGS. 2A-2B), the encoder can perform prediction operation at the level of basic processing sub-units (e.g., CUs). However, in some cases, a basic processing sub-unit can still be too large to process. The encoder can further split the basic processing sub-unit into smaller segments (e.g., referred to as "prediction blocks" or "PBs" in H.265/HEVC or H.266/VVC), at the level of which the prediction operation can be performed.

For another example, at a transform stage (an example of which is shown in FIGS. 2A-2B), the encoder can perform a transform operation for residual basic processing sub-units (e.g., CUs). However, in some cases, a basic processing sub-unit can still be too large to process. The encoder can further split the basic processing sub-unit into smaller segments (e.g., referred to as "transform blocks" or "TBs" in H.265/HEVC or H.266/VVC), at the level of which the transform operation can be performed. It should be noted that the division schemes of the same basic processing sub-unit can be different at the prediction stage and the transform stage. For example, in H.265/HEVC or H.266/VVC, the prediction blocks and transform blocks of the same CU can have different sizes and numbers.

In structure 110 of FIG. 1, basic processing unit 112 is further divided into 3×3 basic processing sub-units, the boundaries of which are shown as dotted lines. Different basic processing units of the same picture can be divided into basic processing sub-units in different schemes.

In some implementations, to provide the capability of parallel processing and error resilience to video encoding and decoding, a picture can be divided into regions for processing, such that, for a region of the picture, the encoding or decoding process can depend on no information from any other region of the picture. In other words, each region of the picture can be processed independently. By doing so, the codec can process different regions of a picture in parallel, thus increasing the coding efficiency. Also, when data of a region is corrupted in the processing or lost in network transmission, the codec can correctly encode or decode other regions of the same picture without reliance on the corrupted or lost data, thus providing the capability of error resilience. In some video coding standards, a picture can be divided into different types of regions. For example, H.265/HEVC and H.266/VVC provide two types of regions: "slices" and "tiles." It should also be noted that different pictures of video sequence 100 can have different partition schemes for dividing a picture into regions.

For example, in FIG. 1, structure 110 is divided into three regions 114, 116, and 118, the boundaries of which are shown as solid lines inside structure 110. Region 114 includes four basic processing units. Each of regions 116 and 118 includes six basic processing units. It should be noted that the basic processing units, basic processing sub-units, and regions of structure 110 in FIG. 1 are only examples, and the present disclosure does not limit embodiments thereof.

FIG. 2A illustrates a schematic diagram of an example encoding process 200A, consistent with embodiments of the disclosure. For example, the encoding process 200A can be performed by an encoder. As shown in FIG. 2A, the encoder can encode video sequence 202 into video bitstream 228 according to process 200A. Similar to video sequence 100 in FIG. 1, video sequence 202 can include a set of pictures (referred to as "original pictures") arranged in a temporal order. Similar to structure 110 in FIG. 1, each original picture of video sequence 202 can be divided by the encoder into basic processing units, basic processing sub-units, or regions for processing. In some embodiments, the encoder can perform process 200A at the level of basic processing units for each original picture of video sequence 202. For example, the encoder can perform process 200A in an iterative manner, in which the encoder can encode a basic processing unit in one iteration of process 200A. In some embodiments, the encoder can perform process 200A in parallel for regions (e.g., regions 114-118) of each original picture of video sequence 202.

In FIG. 2A, the encoder can feed a basic processing unit (referred to as an "original BPU") of an original picture of video sequence 202 to prediction stage 204 to generate prediction data 206 and predicted BPU 208. The encoder can subtract predicted BPU 208 from the original BPU to generate residual BPU 210. The encoder can feed residual BPU 210 to transform stage 212 and quantization stage 214 to generate quantized transform coefficients 216. The encoder can feed prediction data 206 and quantized transform coefficients 216 to binary coding stage 226 to generate video bitstream 228. Components 202, 204, 206, 208, 210, 212, 214, 216, 226, and 228 can be referred to as a "forward path." During process 200A, after quantization stage 214, the encoder can feed quantized transform coefficients 216 to inverse quantization stage 218 and inverse transform stage 220 to generate reconstructed residual BPU 222. The encoder can add reconstructed residual BPU 222 to predicted BPU 208 to generate prediction reference 224, which is used in prediction stage 204 for the next iteration of process 200A. Components 218, 220, 222, and 224 of process 200A can be referred to as a "reconstruction path." The reconstruction path can be used to ensure that both the encoder and the decoder use the same reference data for prediction.

The encoder can perform process 200A iteratively to encode each original BPU of the original picture (in the forward path) and generate predicted reference 224 for encoding the next original BPU of the original picture (in the reconstruction path). After encoding all original BPUs of the original picture, the encoder can proceed to encode the next picture in video sequence 202.

Referring to process 200A, the encoder can receive video sequence 202 generated by a video capturing device (e.g., a camera). The term "receive" used herein can refer to receiving, inputting, acquiring, retrieving, obtaining, reading, accessing, or any action in any manner for inputting data.

At prediction stage 204, at a current iteration, the encoder can receive an original BPU and prediction reference 224, and perform a prediction operation to generate prediction data 206 and predicted BPU 208. Prediction reference 224 can be generated from the reconstruction path of the previous iteration of process 200A. The purpose of prediction stage 204 is to reduce information redundancy by extracting prediction data 206 that can be used to reconstruct the original BPU as predicted BPU 208 from prediction data 206 and prediction reference 224.

Ideally, predicted BPU 208 can be identical to the original BPU. However, due to non-ideal prediction and reconstruction operations, predicted BPU 208 is generally slightly different from the original BPU. For recording such differences, after generating predicted BPU 208, the encoder can subtract it from the original BPU to generate residual BPU 210. For example, the encoder can subtract values (e.g., greyscale values or RGB values) of pixels of predicted BPU 208 from values of corresponding pixels of the original BPU. Each pixel of residual BPU 210 can have a residual value as a result of such subtraction between the corresponding pixels of the original BPU and predicted BPU 208. Compared with the original BPU, prediction data 206 and residual BPU 210 can have fewer bits, but they can be used to reconstruct the original BPU without significant quality deterioration. Thus, the original BPU is compressed.

To further compress residual BPU 210, at transform stage 212, the encoder can reduce spatial redundancy of residual BPU 210 by decomposing it into a set of two-dimensional "base patterns," each base pattern being associated with a "transform coefficient." The base patterns can have the same size (e.g., the size of residual BPU 210). Each base pattern can represent a variation frequency (e.g., frequency of brightness variation) component of residual BPU 210. None of the base patterns can be reproduced from any combinations (e.g., linear combinations) of any other base patterns. In other words, the decomposition can decompose variations of residual BPU 210 into a frequency domain. Such a decomposition is analogous to a discrete Fourier transform of a function, in which the base patterns are analogous to the base functions (e.g., trigonometry functions) of the discrete Fourier transform, and the transform coefficients are analogous to the coefficients associated with the base functions.

Different transform algorithms can use different base patterns. Various transform algorithms can be used at transform stage 212, such as, for example, a discrete cosine transform, a discrete sine transform, or the like. The transform at transform stage 212 is invertible. That is, the encoder can restore residual BPU 210 by an inverse operation of the transform (referred to as an "inverse transform"). For example, to restore a pixel of residual BPU 210, the inverse transform can be multiplying values of corresponding pixels of the base patterns by respective associated coefficients and adding the products to produce a weighted sum. For a video coding standard, both the encoder and decoder can use the same transform algorithm (thus the same base patterns). Thus, the encoder can record only the transform coefficients, from which the decoder can reconstruct residual BPU 210 without receiving the base patterns from the encoder. Compared with residual BPU 210, the transform coefficients can have fewer bits, but they can be used to reconstruct residual BPU 210 without significant quality deterioration. Thus, residual BPU 210 is further compressed.

The encoder can further compress the transform coefficients at quantization stage 214. In the transform process, different base patterns can represent different variation frequencies (e.g., brightness variation frequencies). Because human eyes are generally better at recognizing low-frequency variation, the encoder can disregard information of high-frequency variation without causing significant quality deterioration in decoding. For example, at quantization stage 214, the encoder can generate quantized transform coefficients 216 by dividing each transform coefficient by an integer value (referred to as a "quantization scale factor") and rounding the quotient to its nearest integer. After such an operation, some transform coefficients of the high-frequency base patterns can be converted to zero, and the transform coefficients of the low-frequency base patterns can be converted to smaller integers. The encoder can disregard the zero-value quantized transform coefficients 216, by which the transform coefficients are further compressed. The quantization process is also invertible, in which quantized transform coefficients 216 can be reconstructed to the transform coefficients in an inverse operation of the quantization (referred to as "inverse quantization").

Because the encoder disregards the remainders of such divisions in the rounding operation, quantization stage 214 can be lossy. Typically, quantization stage 214 can contribute the most information loss in process 200A. The larger the information loss is, the fewer bits the quantized transform coefficients 216 can need. For obtaining different levels of information loss, the encoder can use different values of the quantization parameter or any other parameter of the quantization process.

At binary coding stage 226, the encoder can encode prediction data 206 and quantized transform coefficients 216 using a binary coding technique, such as, for example, entropy coding, variable length coding, arithmetic coding, Huffman coding, context-adaptive binary arithmetic coding, or any other lossless or lossy compression algorithm. In some embodiments, besides prediction data 206 and quantized transform coefficients 216, the encoder can encode other information at binary coding stage 226, such as, for example, a prediction mode used at prediction stage 204, parameters of the prediction operation, a transform type at transform stage 212, parameters of the quantization process (e.g., quantization parameters), an encoder control parameter (e.g., a bitrate control parameter), or the like. The encoder can use the output data of binary coding stage 226 to generate video bitstream 228. In some embodiments, video bitstream 228 can be further packetized for network transmission.

Referring to the reconstruction path of process 200A, at inverse quantization stage 218, the encoder can perform inverse quantization on quantized transform coefficients 216 to generate reconstructed transform coefficients. At inverse transform stage 220, the encoder can generate reconstructed residual BPU 222 based on the reconstructed transform coefficients. The encoder can add reconstructed residual BPU 222 to predicted BPU 208 to generate prediction reference 224 that is to be used in the next iteration of process 200A.

It should be noted that other variations of the process 200A can be used to encode video sequence 202. In some embodiments, stages of process 200A can be performed by the encoder in different orders. In some embodiments, one or more stages of process 200A can be combined into a single stage. In some embodiments, a single stage of process 200A can be divided into multiple stages. For example, transform stage 212 and quantization stage 214 can be combined into a single stage. In some embodiments, process 200A can include additional stages. In some embodiments, process 200A can omit one or more stages in FIG. 2A.

FIG. 2B illustrates a schematic diagram of another example encoding process 200B, consistent with embodiments of the disclosure. Process 200B can be modified from process 200A. For example, process 200B can be used by an encoder conforming to a hybrid video coding standard (e.g., H.26x series). Compared with process 200A, the forward path of process 200B additionally includes mode decision stage 230 and divides prediction stage 204 into spatial prediction stage 2042 and temporal prediction stage 2044. The reconstruction path of process 200B additionally includes loop filter stage 232 and buffer 234.

Generally, prediction techniques can be categorized into two types: spatial prediction and temporal prediction. Spatial prediction (e.g., an intra-picture prediction or "intra prediction") can use pixels from one or more already coded neighboring BPUs in the same picture to predict the current BPU. That is, prediction reference 224 in the spatial prediction can include the neighboring BPUs. The spatial prediction can reduce the inherent spatial redundancy of the picture. Temporal prediction (e.g., an inter-picture prediction or "inter prediction") can use regions from one or more already coded pictures to predict the current BPU. That is, prediction reference 224 in the temporal prediction can include the coded pictures. The temporal prediction can reduce the inherent temporal redundancy of the pictures.

Referring to process 200B, in the forward path, the encoder performs the prediction operation at spatial prediction stage 2042 and temporal prediction stage 2044. For example, at spatial prediction stage 2042, the encoder can perform the intra prediction. For an original BPU of a picture being encoded, prediction reference 224 can include one or more neighboring BPUs that have been encoded (in the forward path) and reconstructed (in the reconstructed path) in the same picture. The encoder can generate predicted BPU 208 by extrapolating the neighboring BPUs. The extrapolation technique can include, for example, a linear extrapolation or interpolation, a polynomial extrapolation or interpolation, or the like. In some embodiments, the encoder can perform the extrapolation at the pixel level, such as by extrapolating values of corresponding pixels for each pixel of predicted BPU 208. The neighboring BPUs used for extrapolation can be located with respect to the original BPU from various directions, such as in a vertical direction (e.g., on top of the original BPU), a horizontal direction (e.g., to the left of the original BPU), a diagonal direction (e.g., to the down-left, down-right, up-left, or up-right of the original BPU), or any direction defined in the used video coding standard. For the intra prediction, prediction data 206 can include, for example, locations (e.g., coordinates) of the used neighboring BPUs, sizes of the used neighboring BPUs, parameters of the extrapolation, a direction of the used neighboring BPUs with respect to the original BPU, or the like.

For another example, at temporal prediction stage 2044, the encoder can perform the inter prediction. For an original BPU of a current picture, prediction reference 224 can include one or more pictures (referred to as "reference pictures") that have been encoded (in the forward path) and reconstructed (in the reconstructed path). In some embodiments, a reference picture can be encoded and reconstructed BPU by BPU. For example, the encoder can add reconstructed residual BPU 222 to predicted BPU 208 to generate a reconstructed BPU. When all reconstructed BPUs of the same picture are generated, the encoder can generate a reconstructed picture as a reference picture. The encoder can perform an operation of "motion estimation" to search for a matching region in a scope (referred to as a "search window") of the reference picture. The location of the search window in the reference picture can be determined based on the location of the original BPU in the current picture. For example, the search window can be centered at a location having the same coordinates in the reference picture as the original BPU in the current picture and can be extended out for a predetermined distance. When the encoder identifies (e.g., by using a pel-recursive algorithm, a block-matching algorithm, or the like) a region similar to the original BPU in the search window, the encoder can determine such a region as the matching region. The matching region can have different dimensions (e.g., being smaller than, equal to, larger than, or in a different shape) from the original BPU. Because the reference picture and the current picture are temporally separated in the timeline (e.g., as shown in FIG. 1), it can be deemed that the matching region "moves" to the location of the original BPU as time goes by. The encoder can record the direction and distance of such a motion as a "motion vector." When multiple reference pictures are used (e.g., as picture 106 in FIG. 1), the encoder can search for a matching region and determine its associated motion vector for each reference picture. In some embodiments, the encoder can assign weights to pixel values of the matching regions of respective matching reference pictures.

The motion estimation can be used to identify various types of motions, such as, for example, translations, rotations, zooming, or the like. For inter prediction, prediction data 206 can include, for example, locations (e.g., coordinates) of the matching region, the motion vectors associated with the matching region, the number of reference pictures, weights associated with the reference pictures, or the like.

For generating predicted BPU 208, the encoder can perform an operation of "motion compensation." The motion compensation can be used to reconstruct predicted BPU 208 based on prediction data 206 (e.g., the motion vector) and prediction reference 224. For example, the encoder can move the matching region of the reference picture according to the motion vector, in which the encoder can predict the original BPU of the current picture. When multiple reference pictures are used (e.g., as picture 106 in FIG. 1), the encoder can move the matching regions of the reference pictures according to the respective motion vectors and average pixel values of the matching regions. In some embodiments, if the encoder has assigned weights to pixel values of the matching regions of respective matching reference pictures, the encoder can add a weighted sum of the pixel values of the moved matching regions.

In some embodiments, the inter prediction can be unidirectional or bidirectional. Unidirectional inter predictions can use one or more reference pictures in the same temporal direction with respect to the current picture. For example, picture 104 in FIG. 1 is a unidirectional inter-predicted picture, in which the reference picture (e.g., picture 102) precedes picture 104. Bidirectional inter predictions can use one or more reference pictures at both temporal directions with respect to the current picture. For example, picture 106 in FIG. 1 is a bidirectional inter-predicted picture, in which the reference pictures (e.g., pictures 104 and 108) are at both temporal directions with respect to picture 104.

Still referring to the forward path of process 200B, after spatial prediction 2042 and temporal prediction stage 2044, at mode decision stage 230, the encoder can select a prediction mode (e.g., one of the intra prediction or the inter prediction) for the current iteration of process 200B. For example, the encoder can perform a rate-distortion optimization technique, in which the encoder can select a prediction mode to minimize a value of a cost function depending on a bit rate of a candidate prediction mode and distortion of the reconstructed reference picture under the candidate prediction mode. Depending on the selected prediction mode, the encoder can generate the corresponding predicted BPU 208 and predicted data 206.

In the reconstruction path of process 200B, if intra prediction mode has been selected in the forward path, after generating prediction reference 224 (e.g., the current BPU that has been encoded and reconstructed in the current picture), the encoder can directly feed prediction reference 224 to spatial prediction stage 2042 for later usage (e.g., for extrapolation of a next BPU of the current picture). The encoder can feed prediction reference 224 to loop filter stage 232, at which the encoder can apply a loop filter to prediction reference 224 to reduce or eliminate distortion (e.g., blocking artifacts) introduced during coding of the prediction reference 224. The encoder can apply various loop filter techniques at loop filter stage 232, such as, for example, deblocking, sample adaptive offsets, adaptive loop filters, or the like. The loop-filtered reference picture can be stored in buffer 234 (or "decoded picture buffer") for later use (e.g., to be used as an inter-prediction reference picture for a future picture of video sequence 202). The encoder can store one or more reference pictures in buffer 234 to be used at temporal prediction stage 2044. In some embodiments, the encoder can encode parameters of the loop filter (e.g., a loop filter strength) at binary coding stage 226, along with quantized transform coefficients 216, prediction data 206, and other information.

Figure 3A:
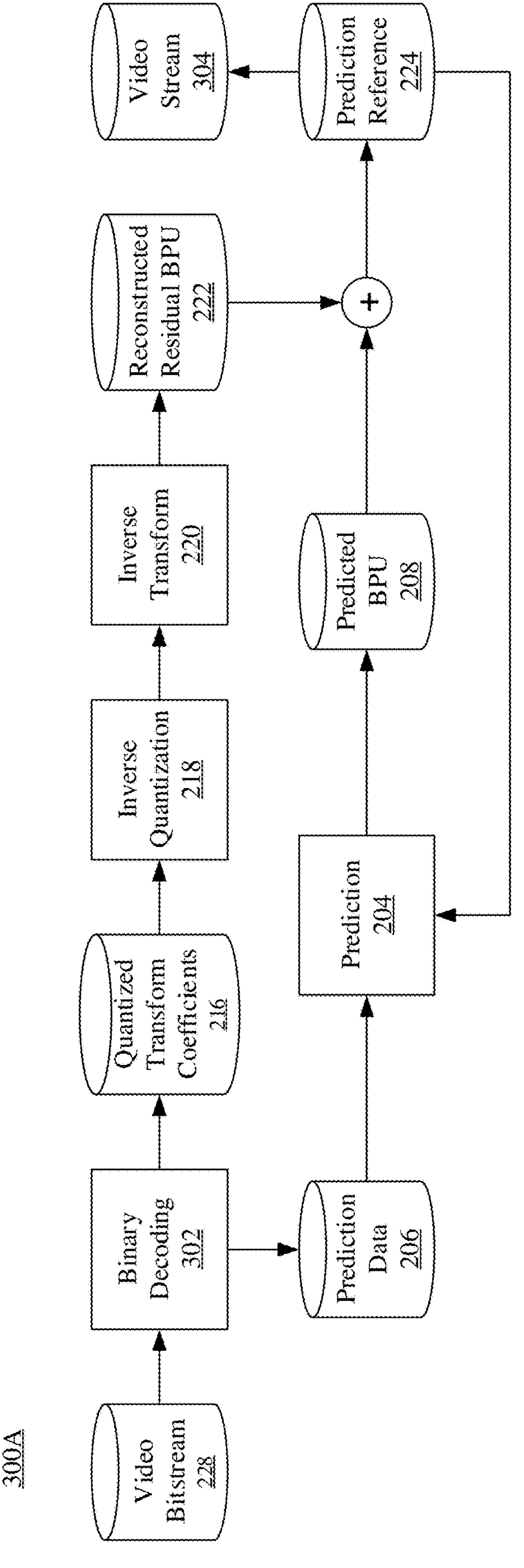
FIG. 3A is a schematic diagram illustrating an exemplary decoding process of a hybrid video coding system, consistent with embodiments of the disclosure.

FIG. 3A illustrates a schematic diagram of an example decoding process 300A, consistent with embodiments of the disclosure. Process 300A can be a decompression process corresponding to the compression process 200A in FIG. 2A. In some embodiments, process 300A can be similar to the reconstruction path of process 200A. A decoder can decode video bitstream 228 into video stream 304 according to process 300A. Video stream 304 can be very similar to video sequence 202. However, due to the information loss in the compression and decompression process (e.g., quantization stage 214 in FIGS. 2A-2B), generally, video stream 304 is not identical to video sequence 202. Similar to processes 200A and 200B in FIGS. 2A-2B, the decoder can perform process 300A at the level of basic processing units (BPUs) for each picture encoded in video bitstream 228. For example, the decoder can perform process 300A in an iterative manner, in which the decoder can decode a basic processing unit in one iteration of process 300A. In some embodiments, the decoder can perform process 300A in parallel for regions (e.g., regions 114-118) of each picture encoded in video bitstream 228.

In FIG. 3A, the decoder can feed a portion of video bitstream 228 associated with a basic processing unit (referred to as an "encoded BPU") of an encoded picture to binary decoding stage 302. At binary decoding stage 302, the decoder can decode the portion into prediction data 206 and quantized transform coefficients 216. The decoder can feed quantized transform coefficients 216 to inverse quantization stage 218 and inverse transform stage 220 to generate reconstructed residual BPU 222. The decoder can feed prediction data 206 to prediction stage 204 to generate predicted BPU 208. The decoder can add reconstructed residual BPU 222 to predicted BPU 208 to generate predicted reference 224. In some embodiments, predicted reference 224 can be stored in a buffer (e.g., a decoded picture buffer in a computer memory). The decoder can feed predicted reference 224 to prediction stage 204 for performing a prediction operation in the next iteration of process 300A.

The decoder can perform process 300A iteratively to decode each encoded BPU of the encoded picture and generate predicted reference 224 for encoding the next encoded BPU of the encoded picture. After decoding all encoded BPUs of the encoded picture, the decoder can output the picture to video stream 304 for display and proceed to decode the next encoded picture in video bitstream 228.

At binary decoding stage 302, the decoder can perform an inverse operation of the binary coding technique used by the encoder (e.g., entropy coding, variable length coding, arithmetic coding, Huffman coding, context-adaptive binary arithmetic coding, or any other lossless compression algorithm). In some embodiments, besides prediction data 206 and quantized transform coefficients 216, the decoder can decode other information at binary decoding stage 302, such as, for example, a prediction mode, parameters of the prediction operation, a transform type, parameters of the quantization process (e.g., quantization parameters), an encoder control parameter (e.g., a bitrate control parameter), or the like. In some embodiments, if video bitstream 228 is transmitted over a network in packets, the decoder can depacketize video bitstream 228 before feeding it to binary decoding stage 302.

Figure 3B:
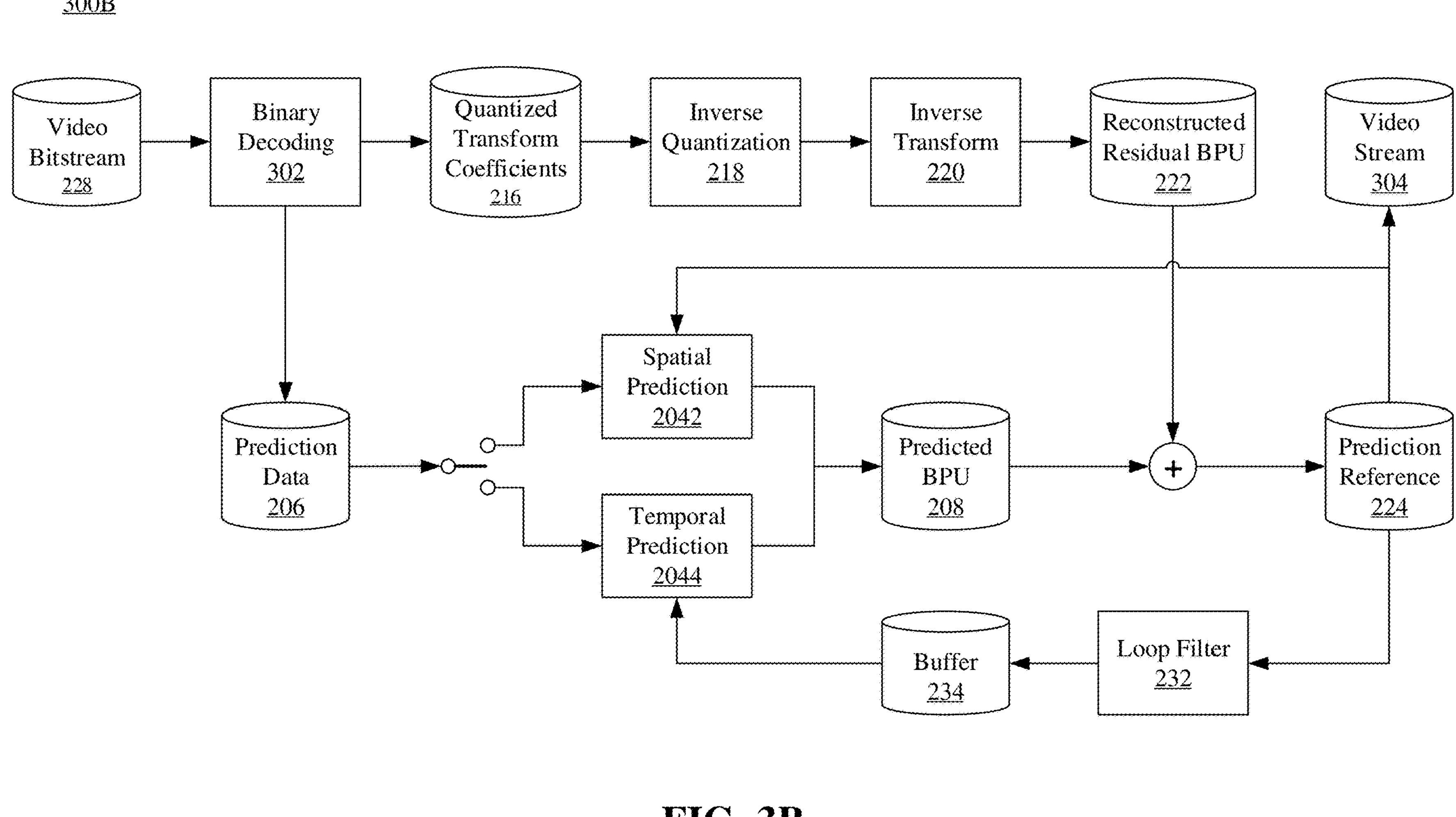
FIG. 3B is a schematic diagram illustrating another exemplary decoding process of a hybrid video coding system, consistent with embodiments of the disclosure.

FIG. 3B illustrates a schematic diagram of another example decoding process 300B, consistent with embodiments of the disclosure. Process 300B can be modified from process 300A. For example, process 300B can be used by a decoder conforming to a hybrid video coding standard (e.g., H.26x series). Compared with process 300A, process 300B additionally divides prediction stage 204 into spatial prediction stage 2042 and temporal prediction stage 2044, and additionally includes loop filter stage 232 and buffer 234.

In process 300B, for an encoded basic processing unit (referred to as a "current BPU") of an encoded picture (referred to as a "current picture") that is being decoded, prediction data 206 decoded from binary decoding stage 302 by the decoder can include various types of data, depending on what prediction mode was used to encode the current BPU by the encoder. For example, if intra prediction was used by the encoder to encode the current BPU, prediction data 206 can include a prediction mode indicator (e.g., a flag value) indicative of the intra prediction, parameters of the intra prediction operation, or the like. The parameters of the intra prediction operation can include, for example, locations (e.g., coordinates) of one or more neighboring BPUs used as a reference, sizes of the neighboring BPUs, parameters of extrapolation, a direction of the neighboring BPUs with respect to the original BPU, or the like. For another example, if inter prediction was used by the encoder to encode the current BPU, prediction data 206 can include a prediction mode indicator (e.g., a flag value) indicative of the inter prediction, parameters of the inter prediction operation, or the like. The parameters of the inter prediction operation can include, for example, the number of reference pictures associated with the current BPU, weights respectively associated with the reference pictures, locations (e.g., coordinates) of one or more matching regions in the respective reference pictures, one or more motion vectors respectively associated with the matching regions, or the like.

Based on the prediction mode indicator, the decoder can decide whether to perform a spatial prediction (e.g., the intra prediction) at spatial prediction stage 2042 or a temporal prediction (e.g., the inter prediction) at temporal prediction stage 2044. The details of performing such spatial prediction or temporal prediction are described in FIG. 2B and will not be repeated hereinafter. After performing such spatial prediction or temporal prediction, the decoder can generate predicted BPU 208. The decoder can add predicted BPU 208 and reconstructed residual BPU 222 to generate prediction reference 224, as described in FIG. 3A.

In process 300B, the decoder can feed predicted reference 224 to spatial prediction stage 2042 or temporal prediction stage 2044 for performing a prediction operation in the next iteration of process 300B. For example, if the current BPU is decoded using the intra prediction at spatial prediction stage 2042, after generating prediction reference 224 (e.g., the decoded current BPU), the decoder can directly feed prediction reference 224 to spatial prediction stage 2042 for later usage (e.g., for extrapolation of a next BPU of the current picture). If the current BPU is decoded using the inter prediction at temporal prediction stage 2044, after generating prediction reference 224 (e.g., a reference picture in which all BPUs have been decoded), the decoder can feed prediction reference 224 to loop filter stage 232 to reduce or eliminate distortion (e.g., blocking artifacts). The decoder can apply a loop filter to prediction reference 224, in a way as described in FIG. 2B. The loop-filtered reference picture can be stored in buffer 234 (e.g., a decoded picture buffer in a computer memory) for later use (e.g., to be used as an inter-prediction reference picture for a future encoded picture of video bitstream 228). The decoder can store one or more reference pictures in buffer 234 to be used at temporal prediction stage 2044. In some embodiments, prediction data can further include parameters of the loop filter (e.g., a loop filter strength). In some embodiments, prediction data includes parameters of the loop filter when the prediction mode indicator of prediction data 206 indicates that inter prediction was used to encode the current BPU.

Figure 4:
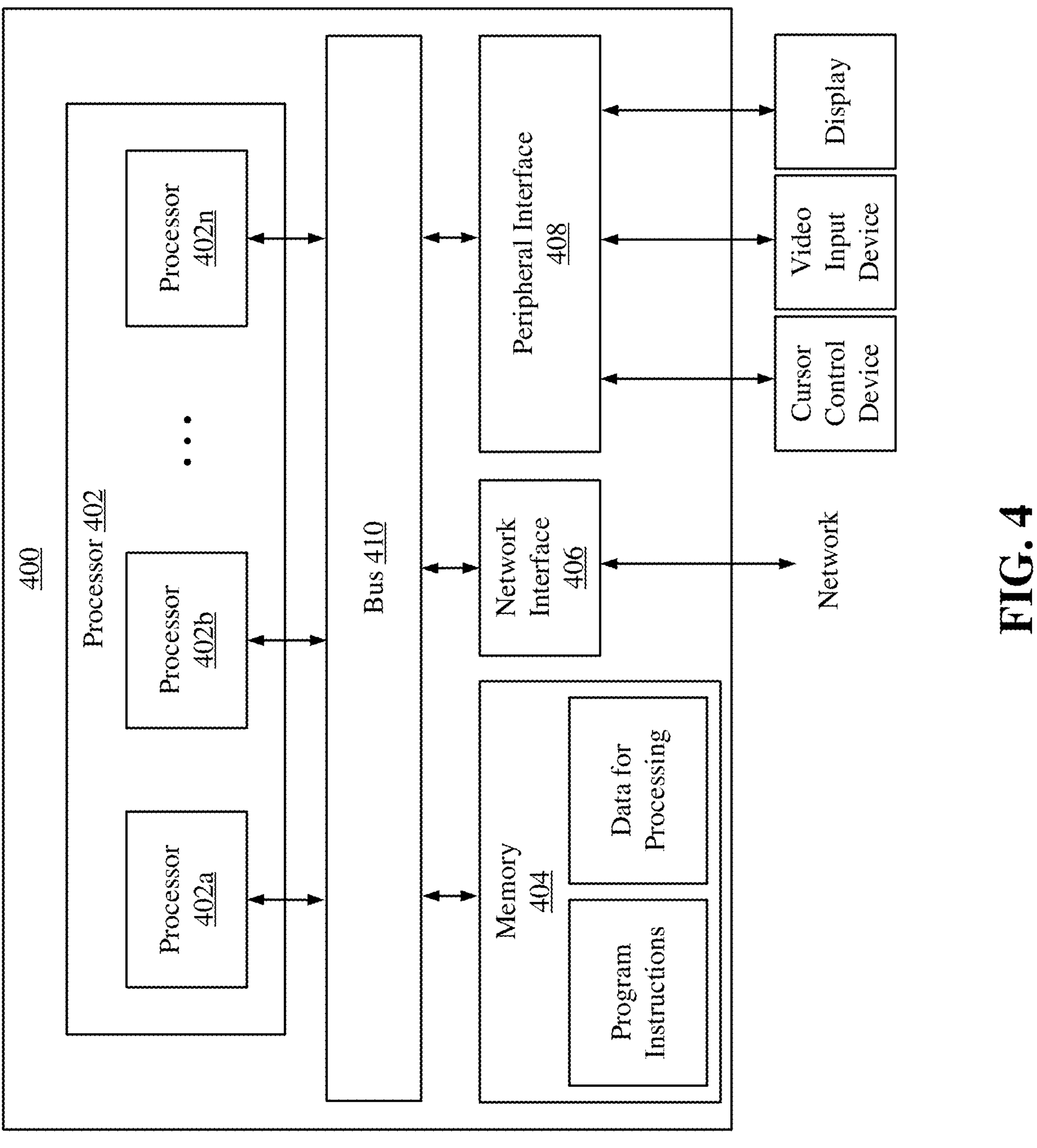
FIG. 4 is a block diagram of an exemplary apparatus for encoding or decoding a video, according to some embodiments of the present disclosure.

FIG. 4 is a block diagram of an example apparatus 400 for encoding or decoding a video, consistent with embodiments of the disclosure. As shown in FIG. 4, apparatus 400 can include processor 402. When processor 402 executes instructions described herein, apparatus 400 can become a specialized machine for video encoding or decoding. Processor 402 can be any type of circuitry capable of manipulating or processing information. For example, processor 402 can include any combination of any number of a central processing unit (or "CPU"), a graphics processing unit (or "GPU"), a neural processing unit ("NPU"), a microcontroller unit ("MCU"), an optical processor, a programmable logic controller, a microcontroller, a microprocessor, a digital signal processor, an intellectual property (IP) core, a Programmable Logic Array (PLA), a Programmable Array Logic (PAL), a Generic Array Logic (GAL), a Complex Programmable Logic Device (CPLD), a Field-Programmable Gate Array (FPGA), a System On Chip (SoC), an Application-Specific Integrated Circuit (ASIC), or the like. In some embodiments, processor 402 can also be a set of processors grouped as a single logical component. For example, as shown in FIG. 4, processor 402 can include multiple processors, including processor 402*a*, processor 402*b*, and processor 402*n*.

Apparatus 400 can also include memory 404 configured to store data (e.g., a set of instructions, computer codes, intermediate data, or the like). For example, as shown in FIG. 4, the stored data can include program instructions (e.g., program instructions for implementing the stages in processes 200A, 200B, 300A, or 300B) and data for processing (e.g., video sequence 202, video bitstream 228, or video stream 304). Processor 402 can access the program instructions and data for processing (e.g., via bus 410), and execute the program instructions to perform an operation or manipulation on the data for processing. Memory 404 can include a high-speed random-access storage device or a non-volatile storage device. In some embodiments, memory 404 can include any combination of any number of a random-access memory (RAM), a read-only memory (ROM), an optical disc, a magnetic disk, a hard drive, a solid-state drive, a flash drive, a security digital (SD) card, a memory stick, a compact flash (CF) card, or the like. Memory 404 can also be a group of memories (not shown in FIG. 4) grouped as a single logical component.

Bus 410 can be a communication device that transfers data between components inside apparatus 400, such as an internal bus (e.g., a CPU-memory bus), an external bus (e.g., a universal serial bus port, a peripheral component interconnect express port), or the like.

For ease of explanation without causing ambiguity, processor 402 and other data processing circuits are collectively referred to as a "data processing circuit" in this disclosure. The data processing circuit can be implemented entirely as hardware, or as a combination of software, hardware, or firmware. In addition, the data processing circuit can be a single independent module or can be combined entirely or partially into any other component of apparatus 400.

Apparatus 400 can further include network interface 406 to provide wired or wireless communication with a network (e.g., the Internet, an intranet, a local area network, a mobile communications network, or the like). In some embodiments, network interface 406 can include any combination of any number of a network interface controller (NIC), a radio frequency (RF) module, a transponder, a transceiver, a modem, a router, a gateway, a wired network adapter, a wireless network adapter, a Bluetooth adapter, an infrared adapter, a near-field communication ("NFC") adapter, a cellular network chip, or the like.

In some embodiments, optionally, apparatus 400 can further include peripheral interface 408 to provide a connection to one or more peripheral devices. As shown in FIG. 4, the peripheral device can include, but is not limited to, a cursor control device (e.g., a mouse, a touchpad, or a touchscreen), a keyboard, a display (e.g., a cathode-ray tube display, a liquid crystal display, or a light-emitting diode display), a video input device (e.g., a camera or an input interface coupled to a video archive), or the like.

It should be noted that video codecs (e.g., a codec performing process 200A, 200B, 300A, or 300B) can be implemented as any combination of any software or hardware modules in apparatus 400. For example, some or all stages of process 200A, 200B, 300A, or 300B can be implemented as one or more software modules of apparatus 400, such as program instructions that can be loaded into memory 404. For another example, some or all stages of process 200A, 200B, 300A, or 300B can be implemented as one or more hardware modules of apparatus 400, such as a specialized data processing circuit (e.g., an FPGA, an ASIC, an NPU, or the like).

Overlapped Block Motion Compensation (OBMC) is an inter coding tool used in Enhanced Compression Model (ECM). When OBMC is applied to a coding unit (CU), it is performed for top and left boundaries of a CU. Moreover, when a CU is coded with sub-CU mode (for example, an affine mode or a decoder side motion vector refinement (DMVR) mode), the OBMC will be further performed for the boundaries of each sub-CU of the CU except the boundaries of the CU. To process boundaries in a uniform fashion, OBMC is performed at a 4×4 sub-block level for all enabled boundaries. OBMC is applied for both the luma and chroma components.

Figure 5:
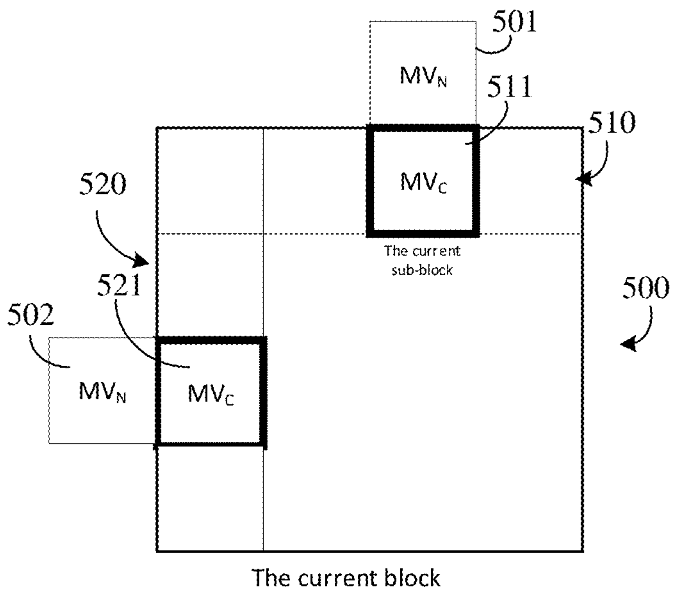
FIG. 5 illustrates an exemplary overlapped block motion compensation (OBMC) performed for block boundary, according to some embodiments of the present disclosure.

FIG. 5 illustrates OBMC performed for block boundary, according to some embodiments of the present disclosure. As shown in FIG. 5, a block 500 is divided into 4×4 sub-blocks. For top and left block boundaries, OBMC is performed at the 4×4 sub-block level. When OBMC applies to the current sub-block 511, besides current motion vector $MV_C$, a motion vector $MV_N$ from neighboring sub-block is also used to derive prediction block for the current sub-block. For example, when a current sub-block 511 is in the top boundary 510, motion vector $MV_N$ from top neighboring sub-block 501, if available and is not identical to the current motion vector $MV_C$, is used to derive prediction block for the current sub-block 511. When a current sub-block 521 is in the left boundary 520, motion vector $MV_N$ from left neighboring sub-block 502, if available and is not identical to the current motion vector $MV_C$ is used to derive prediction block for the current sub-block 521. The prediction signal based on the current motion vector $MV_C$ is denoted as $pred_C$, and the prediction signal based on the neighboring motion vector $MV_N$ is denoted as $pred_N$, are blended to generate the final prediction signal of the current sub-block pred. If $MV_N$ is equal to $MV_C$, the OBMC is not performed for the current sub-block.

In the early ECM, a set of fixed weights are used for blending. For sub-blocks in the top boundary, the samples in the same row share the same weights; for sub-blocks in left boundary, the samples in the same column share the same weights. The weights are shown in Equation 1, where coordinates (i,j) represent the horizontal distance i and vertical distance j between the current chroma sample and the chroma sample in the top left corner of the current 4×4 sub-block.

(Equation 1)

for top boundary $$\begin{cases} pred(i,0) = (26*pred_C(i,0) + 6*pred_N(i,0) + 16) >> 5), 0 \le i < 4 \\ pred(i,1) = (7*pred_C(i,1) + 1*pred_N(i,1) + 4) >> 3), 0 \le i < 4 \\ pred(i,2) = (15*pred_C(i,2) + 1*pred_N(i,2) + 8) >> 4), 0 \le i < 4 \\ pred(i,3) = (31*pred_C(i,3) + 1*pred_N(i,3) + 16) >> 5), 0 \le i < 4 \end{cases}$$

-continued for left boundary $$\begin{cases} pred(0,j) = (26*pred_C(0,j) + 6*pred_N(0,j) + 16) >> 5), 0 \le j < 4 \\ pred(1,j) = (7*pred_C(1,j) + 1*pred_N(1,j) + 4) >> 3), 0 \le j < 4 \\ pred(2,j) = (15*pred_C(2,j) + 1*pred_N(2,j) + 8) >> 4), 0 \le j < 4 \\ pred(3,j) = (31*pred_C(3,j) + 1*pred_N(3,j) + 16) >> 5), 0 \le j < 4 \end{cases}$$

Figure 6:
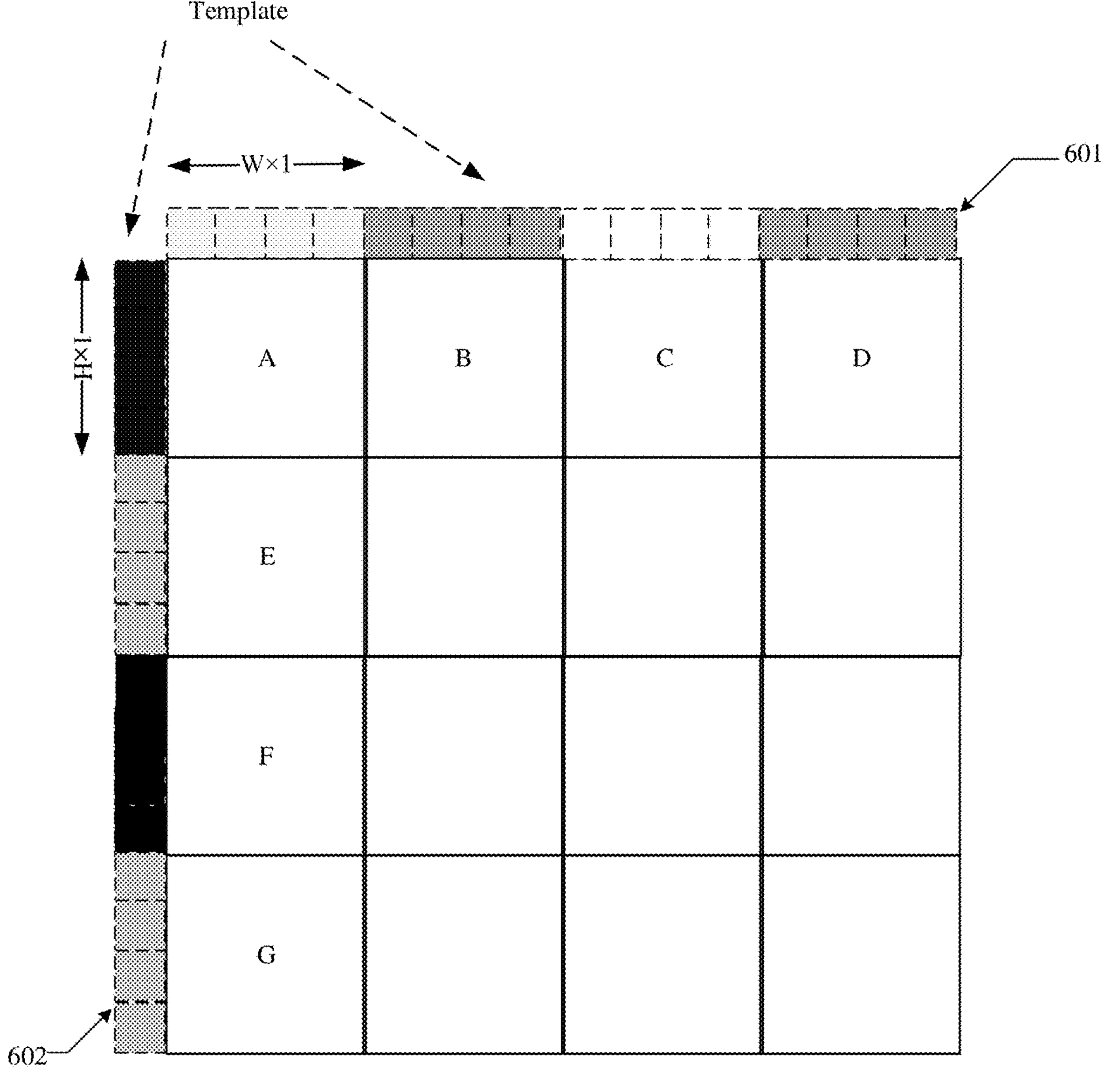
FIG. 6 illustrates an exemplary template of the OBMC, according to some embodiments of the present disclosure.

Then a template matching-based OBMC scheme was adopted. FIG. 6 illustrates a template of the OBMC, according to some embodiments of the present disclosure. As shown in FIG. 6, for each top block (e.g., A, B, C, D) with a size of 4×4 at the top CU boundary, the above template 601 size equals to 4×1. If N adjacent blocks have the same motion information, then the above template size is merged to 4N×1, since the motion compensation operation can be processed at one time. For each left block (e.g., A, E, F, G) with a size of 4×4 at the left CU boundary, the left template 602 size equals to 1×4 or 1×4N.

For each 4×4 top sub-block (or N 4×4 blocks group), the prediction value of boundary samples is derived following the below steps. For example, taking block A as the current block and its above neighboring block AboveNeighbor_A, the operation for left blocks is conducted in the same manner.

First, three template matching costs (Cost1, Cost2, Cost3) are measured by the sum of absolute difference (SAD) between the reconstructed samples of a template and its corresponding reference samples derived by motion compensation process according to the following three types of motion information:

Cost1 is calculated according to A's motion information.

Cost2 is calculated according to AboveNeighbor_A's motion information.

Cost3 is calculated according to weighted prediction of A's and AboveNeighbor_A's motion information with weighting factors as ¾ and ¼ respectively.

Second, one approach is chosen to calculate the final prediction results of boundary samples by comparing Cost1, Cost2, and Cost 3.

If Cost1 is minimum, then pred(i, j)=$pred_C$(i, j), which means OBMC is not performed.

If (Cost2+(Cost2>>2)+(Cost2>>3))<=Cost1, then blending mode 1 is used as shown in Equation 1.

If Cost1<=Cost2, then blending mode 2 is used as shown in Equation 3.

Otherwise, blending mode 3 is used as shown in Equation 2.

For chroma samples, only the first row or column can perform blending.

(Equation 2)

for top boundary $$\begin{cases} pred(i,0) = (7*pred_C(i,0) + 1*pred_N(i,0) + 4) >> 3), 0 \le i < 4 \\ pred(i,1) = (15*pred_C(i,1) + 1*pred_N(i,1) + 8) >> 4), 0 \le i < 4 \\ pred(i,2) = (31*pred_C(i,2) + 1*pred_N(i,2) + 16) >> 5), 0 \le i < 4 \\ pred(i,3) = pred_C(i,3) \qquad , 0 \le i < 4 \end{cases}$$

for left boundary $$\begin{cases} pred(0,j) = (7*pred_C(0,j) + 1*pred_N(0,j) + 4) >> 3), 0 \le j < 4 \\ pred(1,j) = (15*pred_C(1,j) + 1*pred_N(1,j) + 8) >> 4), 0 \le j < 4 \\ pred(2,j) = (31*pred_C(2,j) + 1*pred_N(2,j) + 16) >> 5), 0 \le j < 4 \\ pred(3,j) = pred_C(3,j) \qquad , 0 \le j < 4 \end{cases}$$

-continued (Equation 3)

for top boundary $$\begin{cases} pred(i,0) = (15*Pred_C(i,0) + 1*Pred_N(i,0) + 8) >> 4), & 0 \le i < 4 \\ pred(i,1) = (31*Pred_C(i,1) + 1*Pred_N(i,1) + 16) >> 5), & 0 \le i < 4 \\ pred(i,2) = Pred_C(i,2) & , 0 \le i < 4 \\ pred(i,3) = Pred_C(i,3) & , 0 \le i < 4 \end{cases}$$

for left boundary $$\begin{cases} pred(0,j) = (15*Pred_C(0,j) + 1*Pred_N(0,j) + 8) >> 4), & 0 \le j < 4 \\ pred(1,j) = (31*Pred_C(1,j) + 1*Pred_N(1,j) + 16) >> 5), & 0 \le j < 4 \\ pred(2,j) = (Pred_C(2,j) & , 0 \le j < 4 \\ pred(3,j) = Pred_C(3,j) & , 0 \le j < 4 \end{cases}$$

For sub-CU boundaries, OBMC is performed at a 4×4 sub-block level expects the CU boundaries. For each sub-block, besides current motion vectors, motion vectors of four connected neighboring sub-blocks, if available and are not identical to the current motion vector, are also used to derive prediction block for the current sub-block. These multiple prediction blocks based on multiple motion vectors are combined to generate the final prediction signal of the current sub-block.

For Advanced Motion Vector Prediction (AMVP) mode, a flag is signaled to indicate whether to perform OBMC for a CU. For skip and merge mode, OBMC is always performed without any signaling.

OBMC is controlled by a sequence parameter set (SPS) flag, which can be set based on the hash block hit percentage at encoder. If it is larger than a threshold, the video sequence is interpreted as screen content, and the OBMC is not applied.

OBMC is not applied to a block if there is a neighbor block coded with Intra Block Copy (IBC), palette, or Block-based Differential Pulse-Code Modulation (BDPCM) modes.

When applying OBMC to a sub-block, sub-block boundary check whether OBMC is applied to the boundary is further made based on the reference samples of the current sub-block. If any absolute difference between the prediction sample and non-interpolated (integer pel) reference sample is greater than a threshold, the OBMC is not applied to that boundary.

Intra block copy (IBC) is a tool adopted in VVC. It is well known that it significantly improves the coding efficiency of screen content materials. Since IBC mode is implemented as a block level coding mode, block matching (BM) is performed at the encoder to find the optimal block vector (or motion vector) for each CU. Here, a block vector is used to indicate the displacement from the current block to a reference block, which is already reconstructed inside the current picture. The luma block vector of an IBC-coded CU is in integer precision. The chroma block vector also rounds to integer precision. When combined with AMVR, the IBC mode can switch between 1-pel and 4-pel motion vector precisions. An IBC-coded CU is treated as a third prediction mode other than intra or inter prediction modes. The IBC mode is applicable to the CUs with both width and height smaller than or equal to 64 luma samples.

At the encoder side, hash-based motion estimation is performed for IBC. The encoder performs rate-distortion (RD) check for blocks with either width or height no larger than 16 luma samples. For non-merge mode, the block vector search is performed using hash-based search first. If hash search does not return a valid candidate, block matching based local search can be performed.

In the hash-based search, hash key matching (32-bit cyclic redundancy check (CRC)) between the current block and a reference block is extended to all allowed block sizes. The hash key calculation for every position in the current picture is based on 4×4 subblocks. For the current block of a larger size, a hash key is determined to match that of the reference block when all the hash keys of all 4×4 subblocks match the hash keys in the corresponding reference locations. If hash keys of multiple reference blocks are found to match that of the current block, the block vector costs of each matched reference are calculated and the one with the minimum cost is selected.

In block matching search, the search range is set to cover both the previous and current coding tree units (CTUs).

At CU level, IBC mode is signaled with a flag, and it can be signaled as IBC AMVP mode or IBC skip/merge mode as follows:

In IBC skip/merge mode, a merge candidate index is used to indicate which of the block vectors in the list from neighboring candidate IBC coded blocks is used to predict the current block. The merge list consists of spatial, HMVP, and pairwise candidates.

In IBC AMVP mode, the block vector difference is coded in the same way as a motion vector difference. The block vector prediction method uses two candidates as predictors, one from left neighbor and one from above neighbor (if IBC coded). When either candidate from left neighbor or candidate from above neighbor is not available, a default block vector will be used as a predictor. A flag is signaled to indicate the block vector predictor index.

To reduce memory consumption and decoder complexity, the IBC in VVC allows only the reconstructed portion of the predefined area including the region of current CTU and some region of the left CTU. FIGS. 7A to 7F illustrate a current CTU processing order and the available reference samples in current CTU and left CTU for IBC Mode, according to some embodiments of the present disclosure. As shown in FIGS. 7A to 7F, each block represents 64×64 luma sample unit.

Figure 7A:
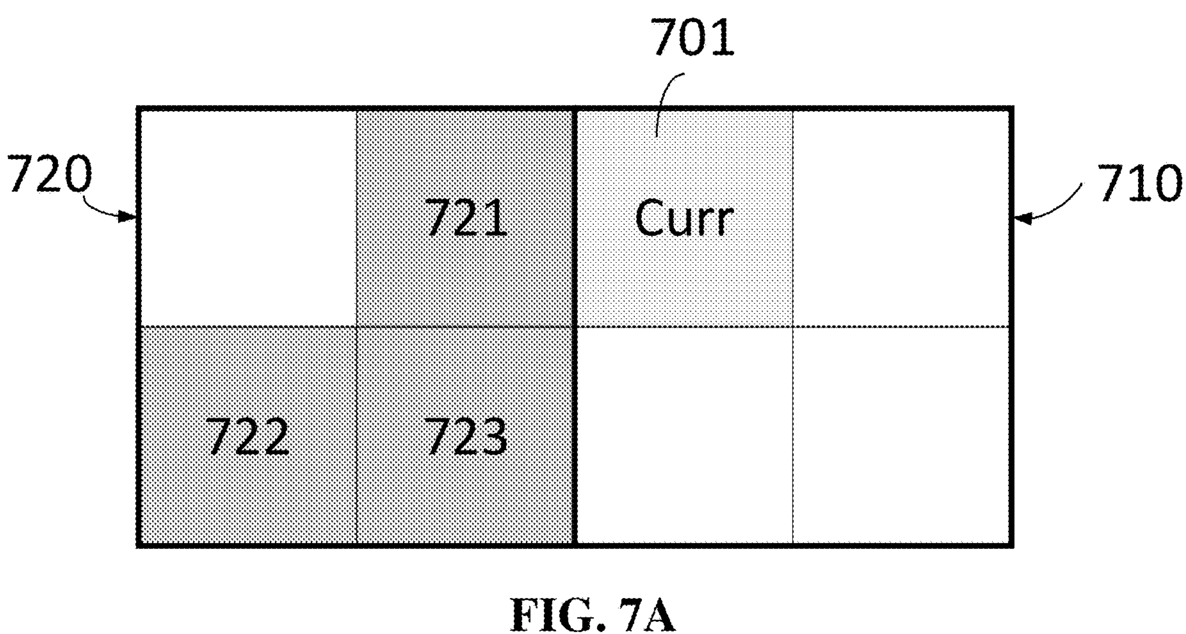
FIG. 7A to FIG. 7F illustrate an exemplary current coding tree unit (CTU) processing order and the available reference samples in current CTU and left CTU for, according to some embodiments of the present disclosure.

Depending on the location of the current CU location within the current CTU, the following applies:

Referring to FIG. 7A, if the current block 701 falls into the top-left 64×64 block of the current CTU 710, then in addition to the already reconstructed samples in the current CTU, it can also refer to the reference samples in the bottom-right 64×64 blocks 723 of the left CTU 720, using current picture referencing (CPR) mode. The current block 701 can also refer to the reference samples in the bottom-left 64×64 block 722 of the left CTU and the reference samples in the top-right 64×64 block 721 of the left CTU, using CPR mode.

Figure 7B:
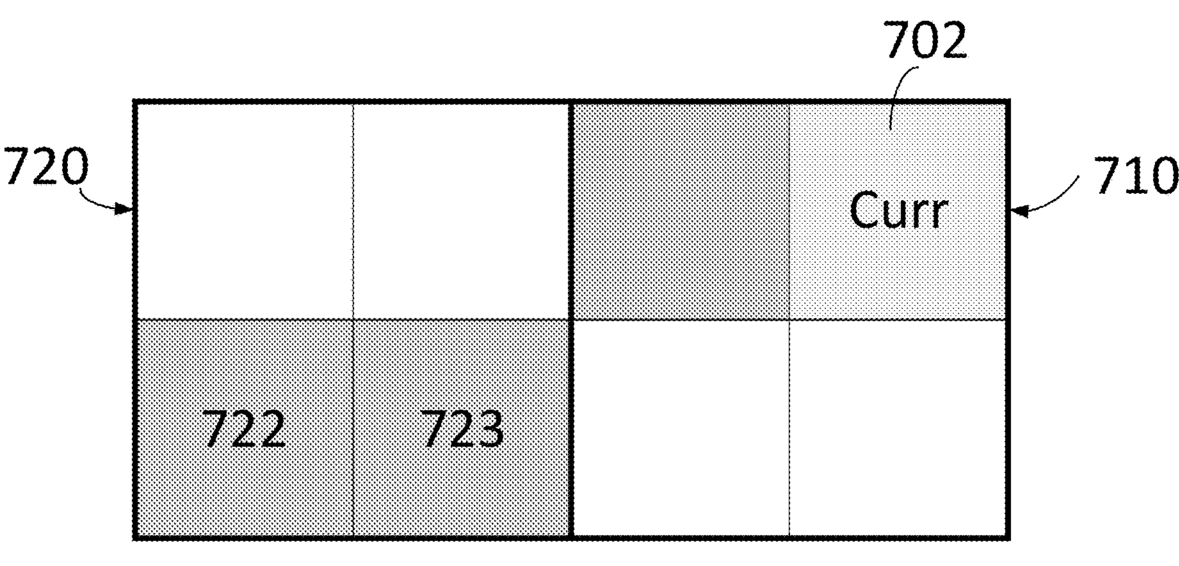

Referring to FIG. 7B, if the current block 702 falls into the top-right 64×64 block of the current CTU and luma location (0, 64) relative to the current CTU 710 has not yet been reconstructed, then in addition to the already reconstructed samples in the current CTU 710, the current block 702 can also refer to the reference samples in the bottom-left 64×64 block 722 and bottom-right 64×64 block 723 of the left CTU 720, using CPR mode.

Figures 7C, 7D:
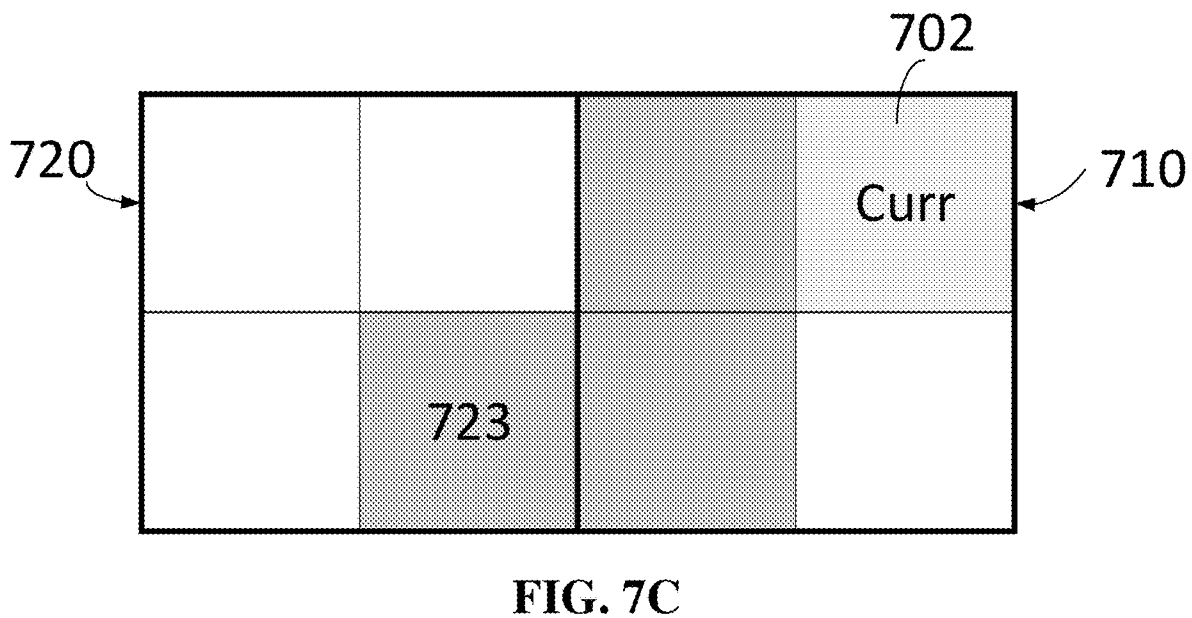

Referring to FIG. 7C, if the current block 702 falls into the top-right 64×64 block of the current CTU and luma location (0, 64) relative to the current CTU 710 has been reconstructed, then in addition to the already reconstructed samples in the current CTU 710, the current block 702 can also refer to the reference samples in the bottom-right 64×64 block 723 of the left CTU 720, using CPR mode.

Figure 7E:
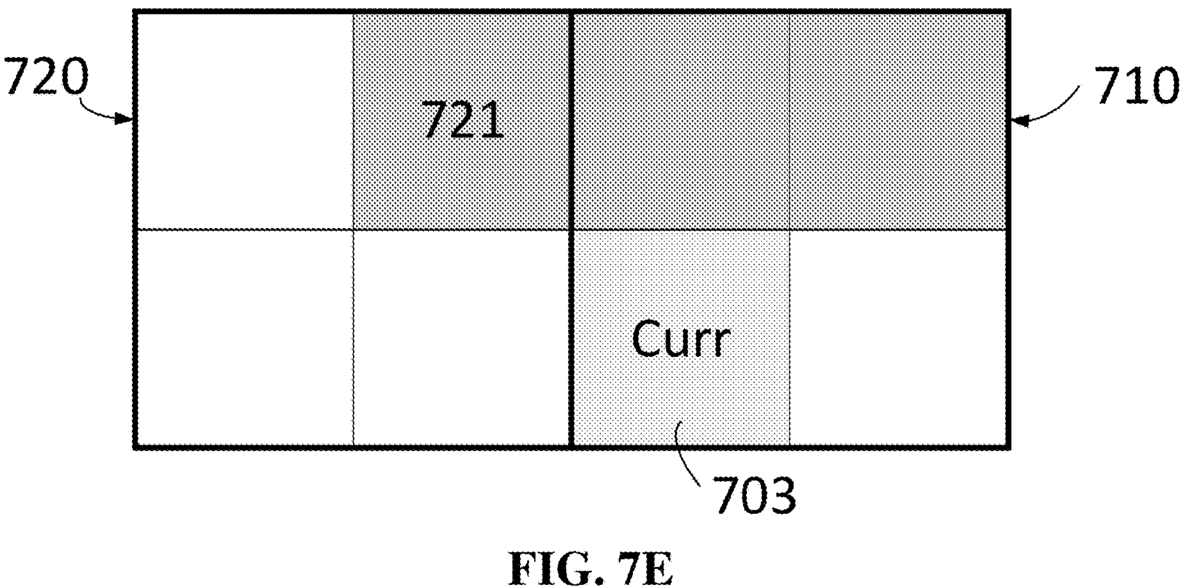

Referring to FIG. 7D, if current block 703 falls into the bottom-left 64×64 block of the current CTU 710 and luma location (64, 0) relative to the current CTU 710 has not yet been reconstructed, then in addition to the already reconstructed samples in the current CTU 710, the current block 703 can also refer to the reference samples in the top-right 64×64 block 721 and bottom-right 64×64 block 723 of the left CTU 720, using CPR mode Referring to FIG. 7E, if current block 703 falls into the bottom-left 64×64 block of the current CTU 710 and luma location (64, 0) relative to the current CTU 710 has been reconstructed, then in addition to the already reconstructed samples in the current CTU 710, the current block 703 can also refer to the reference samples in the bottom-right 64×64 block 723 of the left CTU 720, using CPR mode.

Figure 7F:
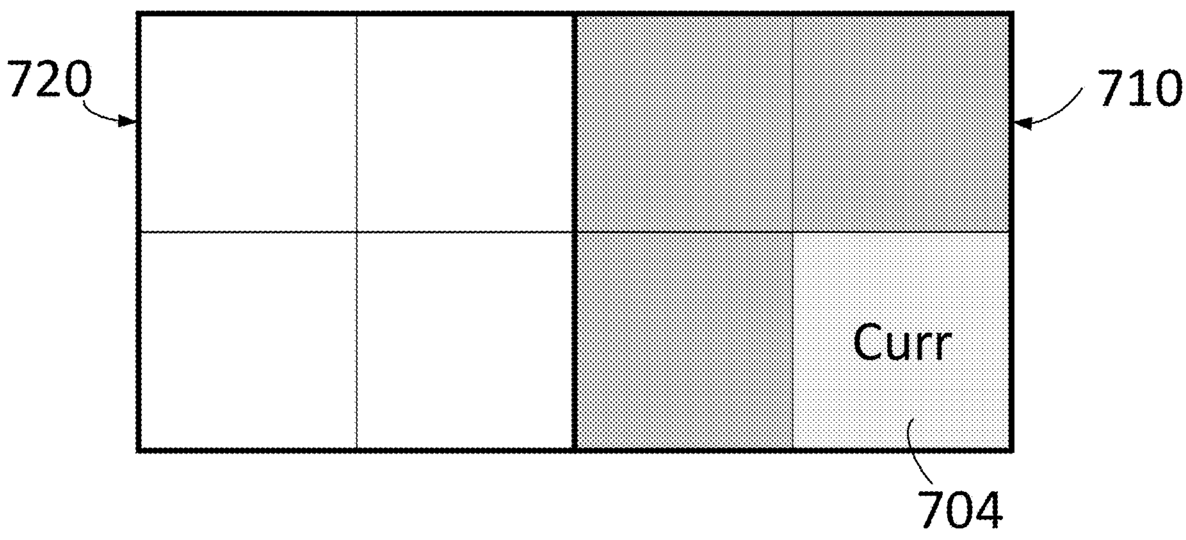

Referring to FIG. 7F, if current block 704 falls into the bottom-right 64×64 block of the current CTU 710, it can only refer to the already reconstructed samples in the current CTU 710, using CPR mode.

This restriction allows the IBC mode to be implemented using local on-chip memory for hardware implementations.

A Reconstruction-Reordered IBC (RR-IBC) mode is allowed for IBC coded blocks. When RR-IBC is applied, the samples in a reconstruction block are flipped according to a flip type of the current block. At the encoder side, the original block is flipped before motion search and residual calculation, while the prediction block is derived without flipping. At the decoder side, the reconstruction block is flipped back to restore the original block.

Two flip methods, horizontal flip and vertical flip, are supported for RR-IBC coded blocks. A syntax flag is firstly signaled for an IBC AMVP coded block, indicating whether the reconstruction is flipped, and if it is flipped, another flag is further signaled specifying the flip type. For IBC merge, the flip type is inherited from neighboring blocks, without syntax signaling. Considering the horizontal or vertical symmetry, the current block and the reference block are normally aligned horizontally or vertically. Therefore, when a horizontal flip is applied, the vertical component of the block vector (BV) is not signaled and inferred to be equal to 0. Similarly, the horizontal component of the BV is not signaled and inferred to be equal to 0 when a vertical flip is applied.

Figure 8A:
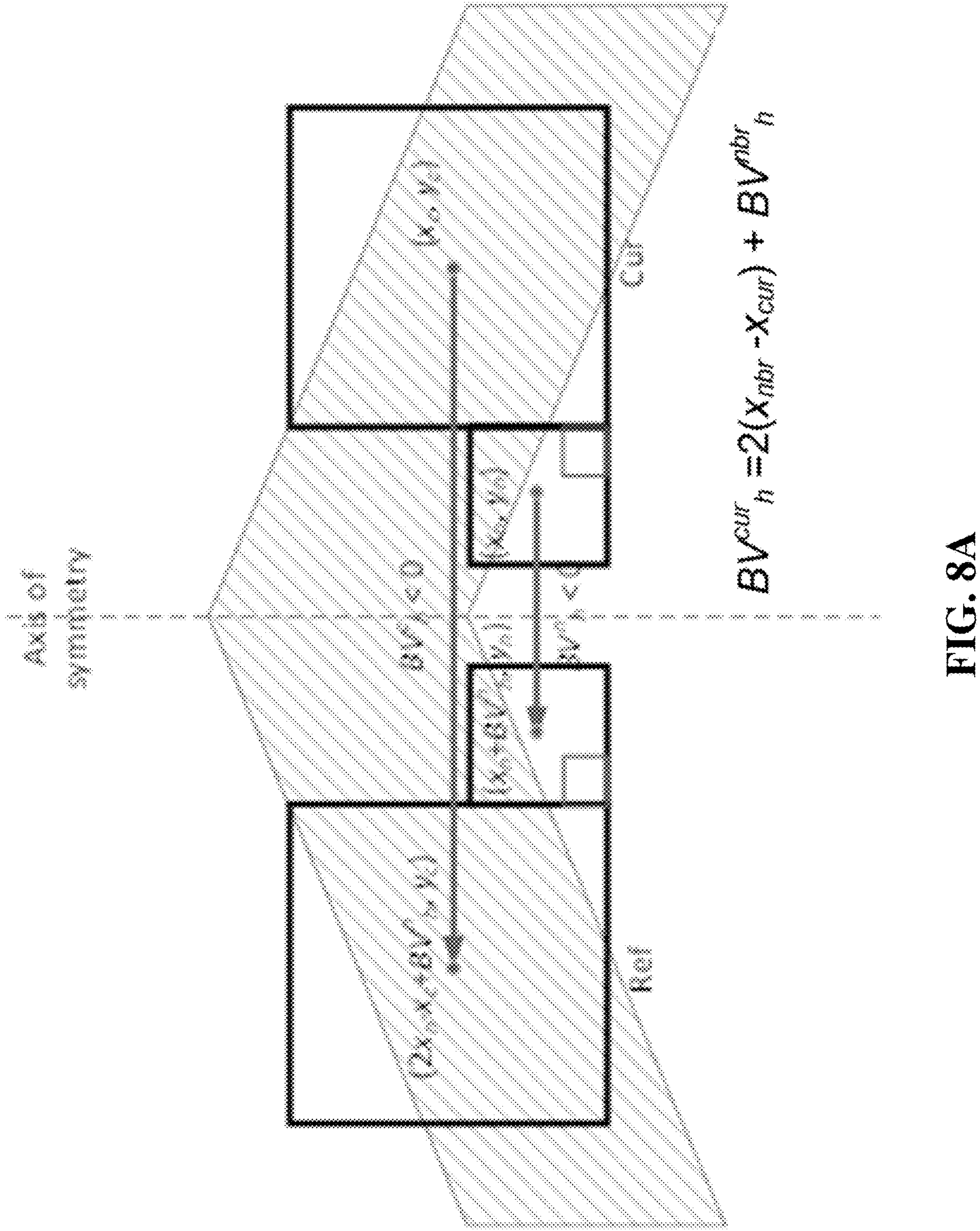
FIG. 8A and FIG. 8B illustrate an exemplary block vector (BV) adjustment for horizontal flip and vertical flip, respectively, according to some embodiments of the present disclosure.
Figure 8B:
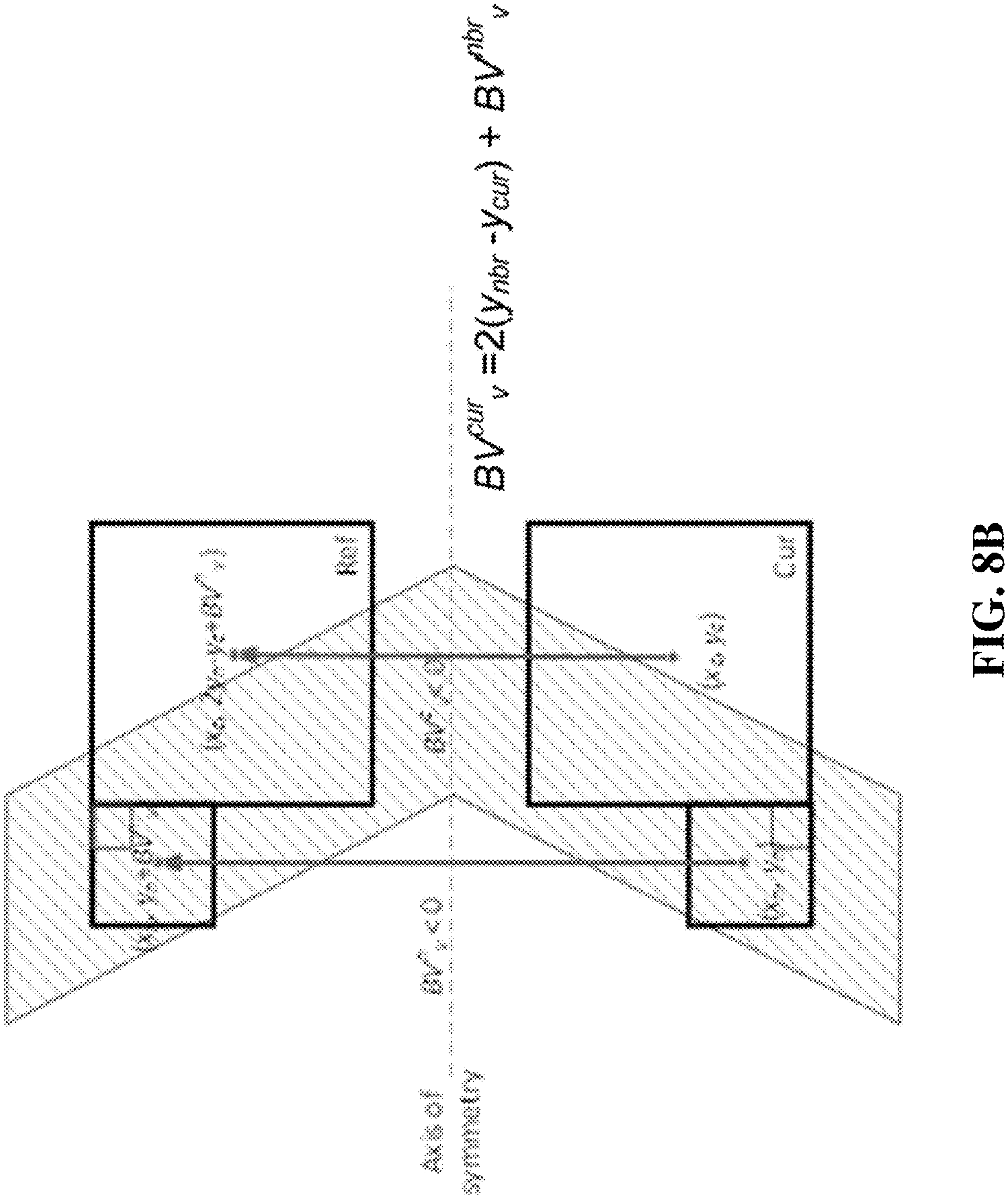

To better utilize the symmetry property, a flip-aware BV adjustment approach is applied to refine the block vector candidate. FIG. 8A and FIG. 8B illustrate BV adjustment for horizontal flip and vertical flip, respectively, according to some embodiments of the present disclosure. For example, as shown in FIG. 8A and FIG. 8B, $(x_{nbr}, y_{nbr})$ and $(x_{cur}, y_{cur})$ represent the coordinates of the center sample of the neighboring block and the current block, respectively, $BV^{nbr}$ and $BV^{cur}$ denotes the BV of the neighboring block and the current block, respectively. As shown in FIG. 8A, instead of directly inheriting the BV from a neighboring block, the horizontal component of $BV^{cur}$ is calculated by adding a motion shift to the horizontal component of $BV^{nbr}$ (denoted as $BV^{nbr}_h$) in case that the neighboring block is coded with a horizontal flip, i.e., $BV^{cur}_h=2(x_{nbr}-x_{cur})+BV^{nbr}_h$. Similarly, as shown in FIG. 8B, the vertical component of $BV^{cur}$ is calculated by adding a motion shift to the vertical component of $BV^{nbr}$ (denoted as $BV^{nbr}_v$) in case that the neighboring block is coded with a vertical flip, i.e., $BV^{cur}_v=2(y_{nbr}-y_{cur})+BV^{nbr}_v$.

Combined intra block copy and intra prediction (IBC-CIIP) is a coding tool for a CU that uses IBC and intra prediction to obtain two prediction signals, and the two prediction signals are weighted summed to generate the final prediction as follows:

$$P=(w_{ibc}*P_{ibc}+((1<<\text{shift})-w_{ibc})*P_{intra}+(1<<(\text{shift}-1)))>>\text{shift}$$

wherein $P_{ibc}$ and $P_{intra}$ denote the IBC prediction signal and intra prediction signal. ($w_{ibc}$, shift) are set equal to (13, 4) and (1, 1) for IBC merge mode and IBC AMVP mode.

An intra prediction mode (IPM) candidate list is used to generate the intra prediction signal, and the IPM candidate list size is pre-defined as 2. An IPM index is signalled to indicate which IPM is used.

Intra block copy with geometry partitioning mode (IBC-GPM) is a coding tool that divides a CU into two sub-partitions geometrically. The prediction signals of the two sub-partitions are generated using IBC and intra prediction. IBC-GPM can be applied to regular IBC merge mode or IBC TM merge mode. An IPM candidate list is constructed, and the IPM candidate list size is pre-defined as 3. There are 48 geometry partitioning modes in total, which are divided into two geometry partitioning mode sets as follows:

TABLE 1

Geometry partitioning modes in the first geometry partitioning mode set

| ibc_gpm_partition_idx | 0 | 1 | 2 | 3 | 4 | 5 | 6 | 7 |
|---|---|---|---|---|---|---|---|---|
| angleIdx | 0 | 0 | 8 | 8 | 16 | 16 | 24 | 24 |
| distanceIdx | 1 | 3 | 1 | 3 | 1 | 3 | 1 | 3 |

TABLE 2

Geometry partitioning modes in the second geometry partitioning mode set

| ibc_gpm_partition_idx | 0 | 1 | 2 | 3 | 4 | 5 | 6 | 7 | 8 | 9 |
|---|---|---|---|---|---|---|---|---|---|---|
| angleIdx | 2 | 2 | 2 | 3 | 3 | 3 | 4 | 4 | 4 | 5 |
| distanceIdx | 0 | 1 | 3 | 0 | 1 | 3 | 0 | 1 | 3 | 0 |
| ibc_gpm_partition_idx | 10 | 11 | 12 | 13 | 14 | 15 | 16 | 17 | 18 | 19 |
| angleIdx | 5 | 5 | 11 | 11 | 11 | 12 | 12 | 12 | 13 | 13 |
| distanceIdx | 1 | 3 | 0 | 1 | 3 | 0 | 1 | 3 | 0 | 1 |
| ibc_gpm_partition_idx | 20 | 21 | 22 | 23 | 24 | 25 | 26 | 27 | 28 | 29 |
| angleIdx | 13 | 14 | 14 | 14 | 18 | 18 | 19 | 19 | 20 | 20 |
| distanceIdx | 3 | 0 | 1 | 3 | 1 | 3 | 1 | 3 | 1 | 3 |
| ibc_gpm_partition_idx | 30 | 31 | 32 | 33 | 34 | 35 | 36 | 37 | 38 | 39 |
| angleIdx | 21 | 21 | 27 | 27 | 28 | 28 | 29 | 29 | 30 | 30 |
| distanceIdx | 1 | 3 | 1 | 3 | 1 | 3 | 1 | 3 | 1 | 3 |

When IBC-GPM is used, an IBC-GPM geometry partitioning mode set flag is signalled to indicate whether the first or the second geometry partitioning mode set is selected, followed by the geometry partitioning mode index. An IBC-GPM intra flag is signalled to indicate whether intra prediction is used for the first sub-partition. When intra prediction is used for a sub-partition, an intra prediction mode index is signalled. When IBC is used for a sub-partition, a merge index is signalled.

Intra block copy with local illumination compensation (IBC-LIC) is a coding tool that compensates the local illumination variation within a picture between the CU coded with IBC and its prediction block with a linear equation. The parameters of the linear equation are derived by the reference template. IBC-LIC can be applied to IBC AMVP mode and IBC merge mode. For IBC AMVP mode, an IBC-LIC flag is signalled to indicate the use of IBC-LIC. For IBC merge mode, the IBC-LIC flag is inferred from the merge candidate.

Intra template matching prediction (Intra TMP) is a special intra prediction mode that copies the best prediction block from the reconstructed part of the current frame, having an L-shaped template that matches the current template. In other worlds, the block vector of the current block is derived by the template in both encoder side and decoder side instead of signaling. For a predefined search range, the encoder searches for the most similar template to the current template in a reconstructed part of the current frame and uses the corresponding block as a prediction block. And the vector that can represent the position of the matched block is stored as the block vector of the current block. The encoder then signals the usage of this mode, and the same prediction operation is performed at the decoder side.

The prediction signal is generated by matching the L-shaped causal neighbor of the current block with another block in a predefined search area.

Sum of absolute differences (SAD) can be used as a cost function. Within each region, the decoder searches for the template that has the least SAD with respect to the current one and uses its corresponding block as a prediction block. A block vector is stored for the current block.

Consistent with the disclosed embodiments, multiple candidate Intra TMP can be used. Intra TMP selects only one matching block that has the smallest template matching cost (SAD value). However, there are usually several blocks that are similar to the current block and their template matching cost are comparable. A multi-candidate Intra TMP method is proposed to use multiple candidates for Intra TMP. A candidate list is constructed, and the candidate matching blocks are ranked in ascending order of their template matching costs. An index is signaled in the bit-stream to indicate which candidate is actually used for a current block.

In Intra TMP fusion mode, the N candidate matching blocks corresponding to the N smallest template matching cost are fused to get the final prediction block of Intra TMP. According to some embodiments, an index is signalled to indicate the candidate set used for Intra TMP fusion. The best 15 block vectors obtained by template matching are designated as BV0 to BV14. The index is used to indicate which one of the three candidate sets {BV0 to BV4}, {BV5 to BV9}, {BV10 to BV14} is used for fusion. Two methods are supported to derive the weight in fusion: the SAD based weight derivation method and the Wiener-filter based weight derivation method. A flag is signaled to indicate which method is used.

In Intra TMP filter mode, linear filter model is applied to the prediction of Intra TMP. A 6-tap linear filter consists of 5 spatial luma samples in the matching block and a bias term. Filter coefficients are derived for each block using the regression based the minimized MSE on samples between the matching template and current template.

Figure 9:
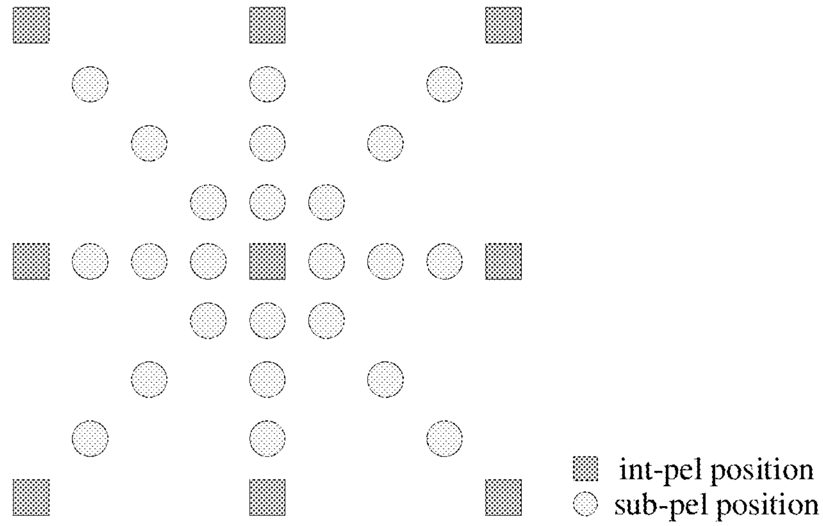
FIG. 9 illustrates an exemplary sub-pel positions used in intra TMP with sub-pel mode, according to some embodiments of the present disclosure.

In Intra TMP with sub-pel mode, three sub-pel precisions, including half-pel, quarter-pel and three quarter-pel, with eight directions around the integer-pel position are supported. FIG. 9 illustrates the sub-pel positions used in intra TMP with sub-pel mode, according to some embodiments of the present disclosure. A precision index is signaled to indicate which of the three sub-pel precisions is used and a direction index is signaled to indicate which of the four directions is used. Four-tap Discrete Cosine Transform based Interpolation Filters (DCT-IF) are used for sub-pel interpolation in Intra TMP.

The intra prediction modes enabled for the luma component in VVC are the Planar, Direct Current (DC), angular intra prediction modes, Multiple Reference Line (MRL) prediction modes, Intra Sub-partition (ISP) modes, and Matrix-based Intra Prediction (MIP) modes.

Figure 10:
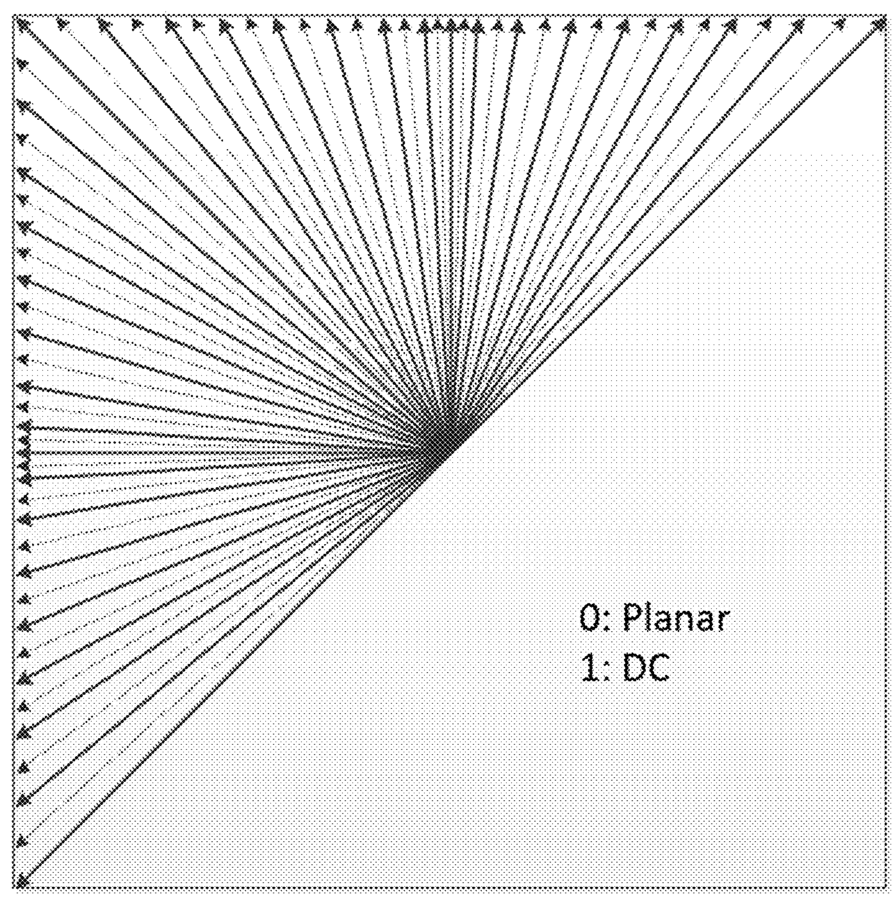
FIG. 10 illustrates exemplary intra prediction modes, according to some embodiments of the present disclosure.

Angular intra prediction is a directional intra prediction method that is supported in HEVC and that is also part of VVC. To capture the arbitrary edge directions presented in natural video, the number of angular intra prediction modes in VVC is extended from 33, as used in HEVC, to 65. FIG. 10 illustrates intra prediction modes, according to some embodiments of the present disclosure. As shown in FIG. 10, the new angular intra prediction modes not in HEVC are depicted as dotted arrows.

As in HEVC, two non-angular intra prediction modes, DC and planar modes are also supported in VVC. The DC intra prediction mode uses the mean sample value of the reference samples to the block for prediction generation. VVC uses the reference samples only along the longer side of a rectangular block to calculate the mean value, while for square blocks the reference samples from both left and above sides are used. In the Planar mode, the predicted sample values are obtained as a weighted average of 4 reference sample values. Here, the reference samples in the same row or column as the current sample and the reference samples on the bottom-left and on the top-right position with respect to the block are used.

In VVC, the results of intra prediction of DC, planar, and several angular modes are further modified by a position dependent intra prediction combination (PDPC) method. PDPC is applied to the following intra modes without signalling: planar, DC, intra angles less than or equal to horizontal, and intra angles greater than or equal to vertical and less than or equal to index 80.

The above-described OBMC methods may have the following problems.

The current OBMC is only performed for inter prediction mode coded blocks to improve coding efficiency. It blends different motion vectors in the boundary to solve the block artifacts. But it can not be performed on a block predicted with an intra mode, for example, intra prediction mode (IPM), intra TMP, IBC, IBC-CIIP, etc. Specifically, current OBMC cannot be performed for intra TMP and IBC coded blocks which use block vectors. The difference between motion vector and block vector is that the motion vector corresponds to a position in another frame, while the block vector corresponds to a position in the current frame. It can be assumed that block artifacts may also exist if the block vector of the current block is different from the block vector of neighboring block.

The present disclosure proposes an OBMC method performed on a block predicted with an intra mode. The intra mode includes one of an intra prediction mode, an intra TMP mode, an IBC mode, an IBC-CIIP mode, an RR-IBC mode, an IBC-AMVP mode, an intra TMP fusion mode, an IBC-LIC mode, an intra TMP filter mode etc.

In some embodiments, an OBMC method using block vectors is proposed. For example, the proposed OBMC method is applied to blocks predicted using intra TMP mode or IBC mode. A block is predicted using the intra TMP mode or the IBC mode, which means that there is a block vector for the current frame, and this block vector corresponds to a reconstructed block in the current frame.

In some embodiments, the OBMC is performed on one or more boundaries of the block, for example, a top boundary or a left boundary of the block, at a sub-block level. For example, a block may include 4×4 sub-blocks, and a sub-block can be a 4×4 sub-block, which means both the width and height of the sub-block are 4 samples for luma component. In some other examples, a block can be at other size and a sub-block can be at other size, which is not limited herein. In some embodiments, the OBMC can be applied on a sub-block level or a sample level.

In some embodiments, when OBMC applied to a current sub-block, besides current block vector $BV_C$, a block vector $BV_N$ from a top neighboring sub-block when the current sub-block is in the top boundary or a block vector $BV_N$ from a left neighboring sub-block when the current sub-block is in the left boundary is also used to derive prediction signal for the current sub-block.

Figure 11:
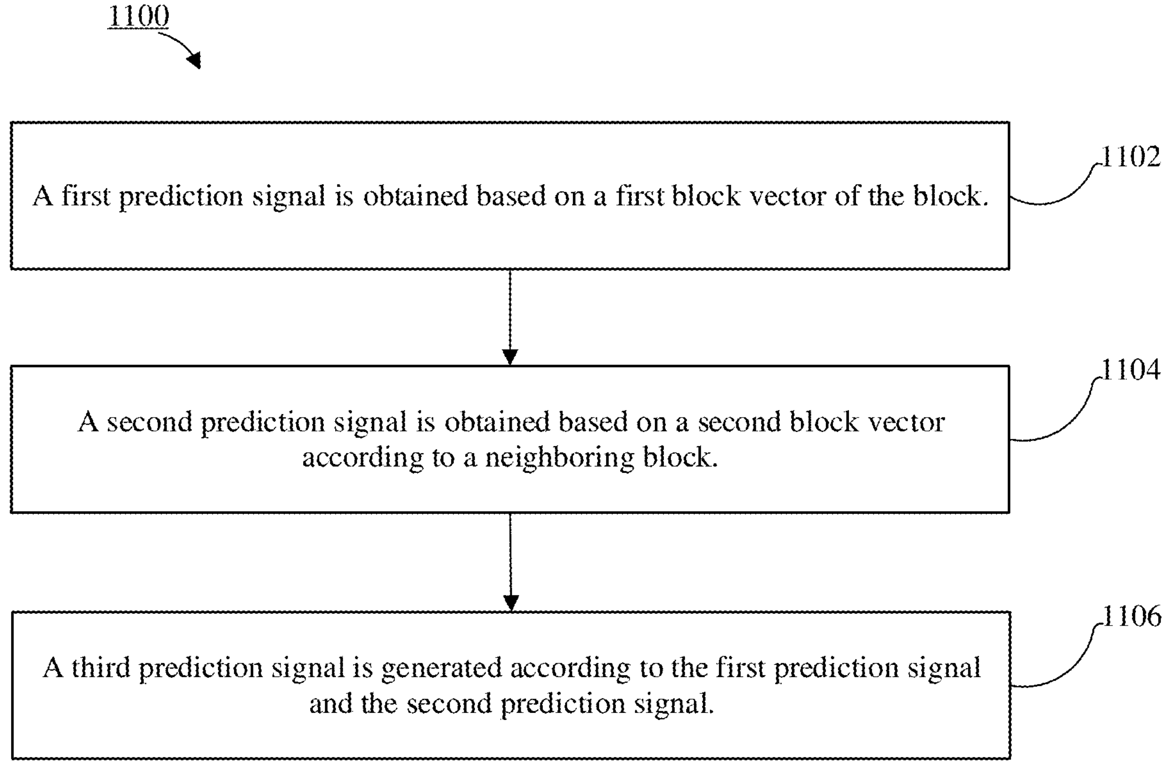
FIG. 11 illustrates a flowchart of an exemplary method for performing OBMC on a block, according to some embodiments of the present disclosure.

FIG. 11 illustrates a flowchart of an exemplary method for performing OBMC on a block, according to some embodiments of the present disclosure. Method 1100 can be performed by an encoder (e.g., by process 200A of FIG. 2A or 200B of FIG. 2B), a decoder (e.g., by process 300A of FIG. 3A or 300B of FIG. 3B) or performed by one or more software or hardware components of an apparatus (e.g., apparatus 400 of FIG. 4). For example, a processor (e.g., processor 402 of FIG. 4) can perform method 1100. In some embodiments, method 1100 can be implemented by a computer program product, embodied in a computer-readable medium, including computer-executable instructions, such as program code, executed by computers (e.g., apparatus 400 of FIG. 4). Referring to FIG. 11, method 1100 may include the following steps 1102 to 1106.

At step 1102, a first prediction signal is obtained based on a first block vector of the block. For example, a prediction signal based on the current block vector $BV_C$ is denoted as $pred_C$ and regarded as the first prediction signal. In some embodiments, the block vector $BV_C$ is obtained by performing an intra TMP or an IBC on the current block. In this way, the OBMC is performed after the prediction signal obtained by using the intra TMP mode or IBC mode. The top boundary and the left boundary of the current block are corrected by using the block vectors of the neighboring blocks at the sub-block level.

Figure 12:
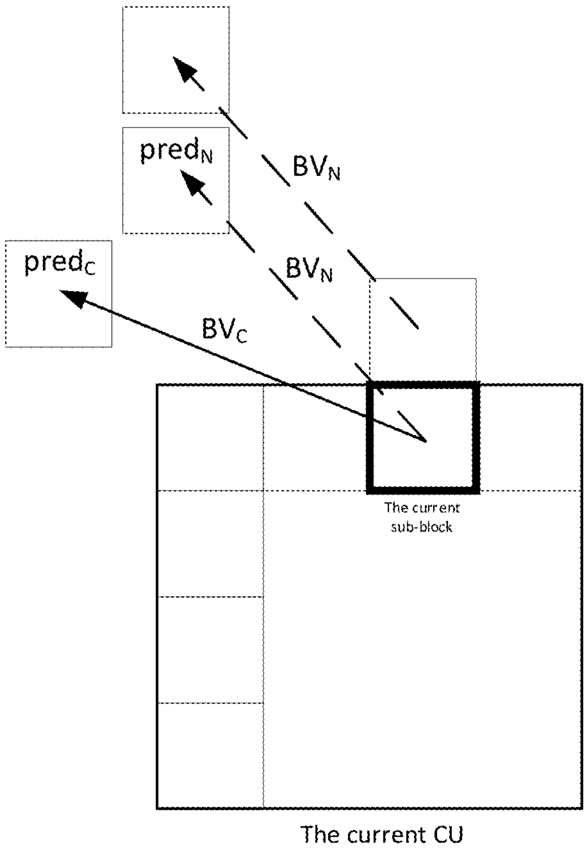
FIG. 12 illustrates an example of $BV_C$, $BV_N$, $pred_C$ and $pred_N$ of a sub-block in the top boundary of the block when performing OBMC, according to some embodiments of the present disclosure.

At step 1104, a second prediction signal is obtained based on a second block vector according to a neighboring block. For example, a prediction signal based on a neighboring block vector $BV_N$ is denoted as $pred_N$ and regarded as the second prediction signal. FIG. 12 illustrates an example of $BV_C$, $BV_N$, $pred_C$ and $pred_N$ of a sub-block 1201 in the top boundary of the block 1210 when performing OBMC, according to some embodiments of the present disclosure.

At step 1106, a third prediction signal is generated according to the first prediction signal and the second prediction signal. For example, the third prediction signal denoted as pred can be generated by blending the first prediction signal $pred_C$ and the second prediction signal $pred_N$.

In some embodiments, the method further includes determining whether the first prediction signal $pred_C$ or the third prediction signal pred to be a final prediction signal used for further processing. If the first prediction signal $pred_C$ is determined to be the final prediction signal, that means, the OBMC could not be performed.

In some embodiments, the OBMC is performed on a sub-block level.

In some embodiments, whether a neighboring sub-block is available is determined. For example, when the neighboring sub-block is out of the frame or slice boundary, or the neighboring sub-block is not predicted by an intra TMP mode or an IBC mode, or the neighboring sub-block do not have a valid block vector, the first prediction signal $pred_C$ is determined to be the final prediction signal.

In some embodiments, whether a neighboring block vector $BV_N$ is available for the current sub-block is determined. When the neighboring block vector $BV_N$ is not available for the current sub-block, which means the sub-block of the corresponding position obtained by using the $BV_N$ to the current sub-block is not available, for example, is out of the frame or slice boundary, or is not reconstructed yet, the first prediction signal $pred_C$ is determined to be the final prediction signal.

In some embodiments, determining whether the first prediction signal $pred_C$ or the third prediction signal pred to be the final prediction signal on a sub-block is determined based on a predicted value of samples of the sub-block.

In some embodiments, a maximum value of the absolute difference between the first prediction signal $pred_C$ and the second prediction signal $pred_N$, is calculated and used to determine whether to perform the OBMC with the first prediction signal $pred_C$ to a sub-block. If the value is greater than (or equal to) a threshold, the first prediction signal $pred_C$ is determined to be the final prediction signal.

In some embodiments, an absolute difference between the average value of the first prediction signal $pred_C$ and the average value of the second prediction signal $pred_N$, is calculated and used to determining whether the first prediction signal $pred_C$ or the third prediction signal pred to be the final prediction signal to a sub-block. If the value is greater than (or equal to) a threshold, the first prediction signal $pred_C$ is determined to be the final prediction signal.

In some embodiments, a sum of the absolute difference (SAD) between the first prediction signal $pred_C$ and the second prediction signal $pred_N$ is calculated and used to determining whether the first prediction signal $pred_C$ or the third prediction signal pred to be the final prediction signal to a sub-block. If the value is greater than (or equal to) a threshold, the first prediction signal $pred_C$ is determined to be the final prediction signal.

In some embodiments, determining whether the first prediction signal $pred_C$ or the third prediction signal pred to be the final prediction signal is determined based on a prediction mode of the neighboring sub-block. For example, when the sub-block is in a top boundary, determining whether the first prediction signal $pred_C$ or the third prediction signal pred to be the final prediction signal to a sub-block is based on a prediction mode of the top neighboring sub-block; and when the sub-block is in a left boundary, determining whether the first prediction signal $pred_C$ or the third prediction signal pred to be the final prediction signal to a sub-block is based on a prediction mode of the left neighboring sub-block. In some embodiments, when the left neighbouring sub-block or top neighbouring sub-block is one of an IBC GPM mode, an IBC CIIP mode, an RR-IBC mode, or an intra TMP fusion mode, the first prediction signal $pred_C$ is determined to be the final prediction signal to the sub-block.

In some embodiments, at step 1106, the blending is performed by the follow equation, where coordinates (i, j) represent the horizontal distance i and vertical distance j between the current sample and the sample in the top left corner of the current sub-block. For sub-blocks in the top boundary, the samples in the same row share the same weights; for sub-blocks in the left boundary, the samples in the same column share the same weights. In Equation 4, $w0_C$ to $w3_C$ are the weights for $pred_C$ in each row or column, $w0_N$ to $w3_N$ are the weights for $Pred_N$ in each row or column, which can be any integer value.

(Equation 4)

for top boundary $$\begin{cases} pred(i,0) = (w0_C * pred_C(i,0) + w0_N * pred_N(i,0) + \text{offset}0) >> \text{shift}0), 0 \le i < 4 \\ pred(i,0) = (w1_C * pred_C(i,0) + w1_N * pred_N(i,0) + \text{offset}1) >> shift1), 0 \le i < 4 \\ pred(i,0) = (w2_C * pred_C(i,0) + w2_N * pred_N(i,0) + \text{offset}2) >> shift2), 0 \le i < 4 \\ pred(i,0) = (w3_C * pred_C(i,0) + w3_N * pred_N(i,0) + \text{offset}3) >> shift3), 0 \le i < 4 \end{cases}$$

for left boundary $$\begin{cases} pred(0,j) = (w0_C * pred_C(0,j) + w0_N * pred_N(0,j) + \text{offset}0) >> \text{shift}0), 0 \le i < 4 \\ pred(1,j) = (w1_C * pred_C(1,j) + w1_N * pred_N(1,j) + \text{offset}1) >> shift1), 0 \le i < 4 \\ pred(2,j) = (w2_C * pred_C(2,j) + w2_N * pred_N(2,j) + \text{offset}2) >> shift2), 0 \le i < 4 \\ pred(3,j) = (w3_C * pred_C(3,j) + w3_N * pred_N(3,j) + \text{offset}3) >> shift3), 0 \le i < 4 \end{cases}$$

In some embodiments, the weights used for blending in OBMC for a sub-block are determined based on the first prediction signal $pred_c$ and the first prediction signal $pred_N$. For example, the weights used for blending are determined based on a maximum value of the absolute difference between $pred_C$ and $pred_N$, or the absolute difference between the average value of $pred_C$ and the average value of $pred_N$, or the SAD value between $pred_C$ and $pred_N$.

In some embodiments, the maximum value max of the absolute difference between $pred_C$ and $pred_N$ is used to determine the weight use for blending for a sub-block in OBMC. When the max is greater than a threshold TH1, the first prediction signal $pred_C$ is determined to be the final prediction signal; when the max is greater than a threshold TH2 and less than (or equal to) threshold TH1, the weights corresponding to Equation 3 are used; when max is greater than a threshold TH3 and less than (or equal to) the threshold TH2, the weights corresponding to Equation 2 are used; when the max is less than (or equal to) the threshold TH3, the weights corresponding to Equation 1 are used. The thresholds TH1, TH2 and TH3 can be any positive integers, in one example, TH1=384, TH2=264 and TH3=144.

In some embodiments, when the max is greater than a threshold TH4, the first prediction signal $pred_C$ is determined to be the final prediction signal to the current sub-block; when the max is greater than a threshold TH5 and less than (or equal to) the threshold TH4, the weights corresponding to Equation 5 are used; when the max is greater than a threshold TH6 and less than (or equal to) the threshold TH5, the weights corresponding to Equation 3 are used; when the max is greater than a threshold TH7 and less than (or equal to) the threshold TH4, the weights corresponding to Equation 2 are used; when the max is less than (or equal to) the threshold TH7, the weights corresponding to Equation 1 are used. The thresholds TH4, TH5, TH6 and TH7 can be any positive integers.

(Equation 5)

for top boundary $$\begin{cases} pred(i,0) = (31 * Pred_C(i,0) + 1 * Pred_N(i,0) + 16) >> 5), 0 \le i < 4 \\ pred(i,1) = Pred_C(i,1) \quad , 0 \le i < 4 \\ pred(i,2) = Pred_C(i,2) \quad , 0 \le i < 4 \\ pred(i,3) = Pred_C(i,3) \quad , 0 \le i < 4 \end{cases}$$

-continued for left boundary $$\begin{cases} pred(0,j) = (31 * Pred_C(0,j) + 1 * Pred_N(0,j) + 16) >> 5), 0 \le j < 4 \\ pred(1,j) = Pred_C(1,j) \quad , 0 \le j < 4 \\ pred(2,j) = Pred_C(2,j) \quad , 0 \le j < 4 \\ pred(3,j) = Pred_C(3,j) \quad , 0 \le j < 4 \end{cases}$$

In some embodiments, for a sub-block, it is proposed that the first prediction signal $pred_C$ and the third prediction signal pred can be further blended to generate a fourth prediction signal pred(i, j)' of the current block as shown in Equation 6, where w can be calculated based on the SAD value between $pred_C$ and $pred_N$ as shown in Equation 7, where TH is a threshold.

$$pred(i,j)' = w * pred_c(i,j) + (1-w) * pred(i,j) \quad \text{(Equation 6)}$$

$$w = \begin{cases} 1, SAD \ge TH \\ \frac{SAD}{TH}, SAD < TH \end{cases} \quad \text{(Equation 7)}$$

The fourth prediction signal is determined to be the final prediction signal to use for further processing.

In some embodiments, for some consecutive sub-blocks, these consecutive sub-blocks can be merged to perform the OBMC.

Figure 13:
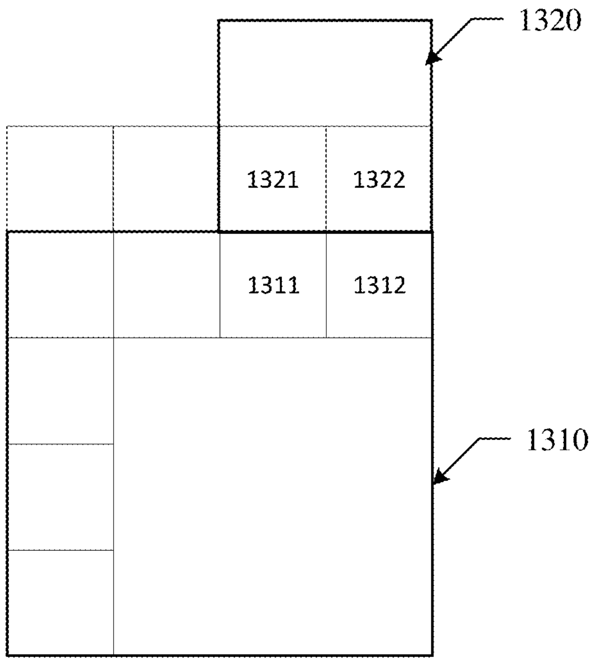
FIG. 13 illustrates an exemplary block showing the merge block, according to some embodiments of the present disclosure.

In some embodiments, whether to merge sub-blocks is determined based on whether the neighboring sub-blocks corresponding to the consecutive sub-blocks respectively are in a same block. For example, FIG. 13 illustrates an exemplary block showing the merge block, according to some embodiments of the present disclosure. As shown in FIG. 13, if the top neighboring sub-block 1321 of sub-block 1311 and the top neighboring sub-block 1322 of sub-block 1312 are in the same block 1320, sub-block 1311 and sub-block 1312 of block 1310 can be merged to a larger sub-block (if the original sub-block is 4×4, then the merged sub-block is 8×4), and the OBMC is performed on the merged-sub-blocks.

In some embodiments, whether to merge sub-blocks is determined based on whether the $BV_N$ and the prediction mode parameters of each neighboring sub-block corresponding to each of the adjacent sub-blocks are the same. For example, referring to FIG. 13, if the $BV_N$ and the prediction mode parameters of the neighboring sub-block 1321 of sub-block 1311 and the $BV_N$ and the prediction mode parameters of the neighboring sub-block 1322 of sub-block 1312 are the same, sub-block 1311 and sub-block 1312 of block 1310 can be merged to a larger sub-block (if the original sub-block is 4×4, then the merged sub-block is 8×4), and the OBMC is performed on the merged-sub-blocks.

In some embodiments, the prediction parameters of neighboring sub-block can be used to generate the second prediction signal $pred_N$, that means, the prediction parameters of neighboring sub-block can be inherited to apply to the current sub-block.

In some embodiments, when performing the OBMC to a sub-block, $pred_N$ is generated by the $BV_N$ and the prediction parameters of the neighboring sub-block. In other worlds, the prediction parameters of the neighboring sub-block are inherited to the current sub-block to obtain the $pred_N$.

In some embodiments, when a neighboring sub-block is predicted by an Intra TMP filter mode, the filter coefficients are inherited. In this example, the current sub-block is also predicted by Intra TMP filter mode, and the $pred_N$ used for the OBMC is generated by $BV_N$ and the filter coefficients from the neighboring sub-block. In some embodiments, when the neighboring sub-block is predicted by Intra TMP filter mode, only the $BV_N$ is used to generate $pred_N$.

In some embodiments, when the neighboring sub-block is predicted by Intra TMP fusion mode, the used block vectors and the fusion weights are inherited. In this example, the current sub-block is also predicted by Intra TMP fusion mode, and the $pred_N$ used for the OBMC is generated by $BV_N$ and fusion weights used in the neighboring sub-block. In some embodiments, when at least one of the block vectors used in fusion is not available for the current sub-block, only the $BV_N$ (which is the block vector stored in the neighboring sub-block) is used to generate $pred_N$. In some embodiments, when at least one of the block vectors used in fusion is not available for the current sub-block, the first prediction signal $pred_C$ is determined to be the final prediction signal to the current sub-block. In some embodiments, when the neighboring sub-block is predicted by Intra TMP fusion mode, only the $BV_N$ (which is the block vector stored in the neighboring sub-block) is used to generate $pred_N$.

In some embodiments, when the neighboring sub-block is predicted by an Intra TMP sub-pel mode, the used sub-pel precision and direction are inherited. In this example, the current sub-block is also predicted by the Intra TMP sub-pel mode, and the $pred_N$ used for the OBMC is generated by $BV_N$ and the sub-pel precision and direction used in the neighboring sub-block. In some embodiments, when the neighboring sub-block is predicted by Intra TMP sub-pel mode, only the $BV_N$ (which is the block vector stored in the neighboring sub-block) is used to generate $pred_N$.

In some embodiments, when the neighboring sub-block is predicted by an IBC LIC mode, the LIC parameters are inherited. In this example, the current sub-block is also predicted by the IBC LIC mode with $BV_N$, and the $pred_N$ used for the OBMC is generated by $BV_N$ and the LIC parameters from the neighboring sub-block. In some embodiments, when the neighboring sub-block is predicted by the IBC LIC mode, only the $BV_N$ (which is the block vector stored in the neighboring sub-block) is used to generate $pred_N$.

In some embodiments, when the neighboring sub-block is predicted by an IBC CIIP mode, the intra prediction mode and weights are inherited. In this example, the current sub-block is also predicted by the IBC CIIP mode, and the $pred_N$ used for the OBMC is generated by weighting the $BV_N$ and a prediction signal obtained by the intra prediction mode with the weights from the neighboring sub-block. In some embodiments, when the neighboring sub-block is predicted by the IBC-CIIP mode, only the $BV_N$ (which is the block vector stored in the neighboring sub-block) is used to generate $pred_N$.

In some embodiments, when the neighboring sub-block is predicted by an IBC GPM mode, the intra prediction mode and the geometry partitioning mode are inherited. In this example, the current sub-block is also predicted by the IBC-GPM mode, and the $pred_N$ used for the OBMC is generated by the $BV_N$ and the prediction signal and the partitioning mode from the neighboring sub-block. In some embodiments, when the neighboring sub-block is predicted by the IBC-GPM mode, only the $BV_N$ (which is the block vector stored in the neighboring sub-block) is used to generate $pred_N$.

In some embodiments, when the neighboring sub-block is predicted by a RR-IBC mode, the first prediction signal $pred_C$ is determined to be the final prediction signal to the current sub-block.

In the aforementioned embodiments, when the neighboring sub-block is predicted by an intra prediction mode, that means the neighboring sub-block is predicted by non-Intra TMP mode or non-IBC mode, or there is no block vector stored for the neighboring sub-block, the first prediction signal $pred_C$ is determined to be the final prediction signal to the current sub-block.

In some embodiments, when the neighboring sub-block is predicted by an intra prediction mode, the $pred_N$ for the OBMC can be generated by the stored intra prediction mode (one of the angular modes, a planar mode, and a DC mode) of the neighboring sub-block.

Figure 14:
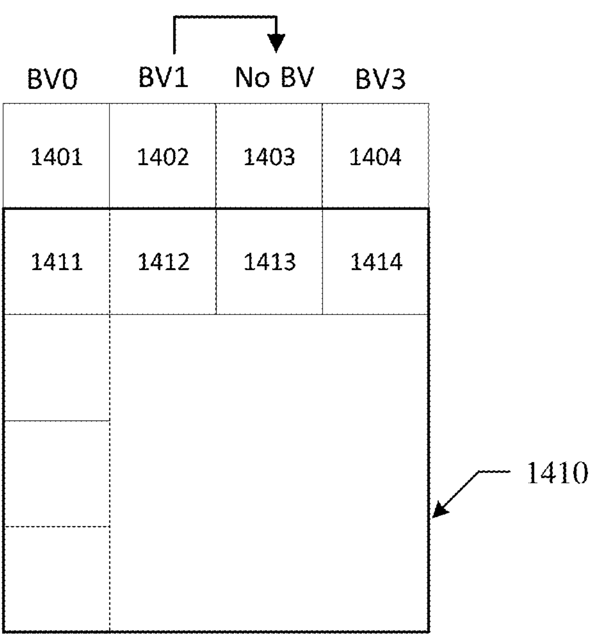
FIG. 14 illustrates an exemplary block showing a padding method of block vector, according to some embodiments of the present disclosure.

In some embodiments, when the neighboring sub-block is predicted by an intra prediction mode, a block vector can be derived to generate $pred_N$ of the current sub-block. For example, a padding method is used to derive the block vector of an intra prediction mode coded neighboring block. In some embodiments, for a neighboring sub-block in the top boundary of a block, if there is no stored block vector for the neighboring sub-block, the block vector from left and right adjacent sub-blocks of the neighboring sub-block can be padded to the neighboring sub-block; for a neighboring sub-block in the left boundary of a block, if there is no stored block vector for the neighboring sub-block, the block vector from top and bottom adjacent sub-blocks of the neighboring sub-block can be padded to the neighboring sub-block. For example, FIG. 14 illustrates an exemplary block showing a padding method of block vector, according to some embodiments of the present disclosure. As shown in FIG. 14, the neighboring sub-block 1403 of sub-block 1413 is predicted by an intra prediction mode so that neighboring sub-block 1403 has no stored block vector, then the block vector BV1 of neighboring sub-block 1402 can be padded to the neighboring sub-block 1403. When performing the OBMC on the sub-block 1413, block vector BV1 is used to generate $pred_N$. In another example, when performing the OBMC on the sub-block 1413, both block vector BV1 of neighboring sub-block 1402 and BV3 of neighboring sub-block 1404 are used to generate the $pred_N$.

In some embodiments, not only the block vector is padded, but also the prediction parameters are padded, such as the prediction mode, the filter coefficients of Intra TMP filter mode, the block vectors and the fusion weights of the Intra TMP fusion mode, sub-pel precision and direction of the Intra TMP sub-pel mode, the LIC parameters of IBC-LIC mode, the intra prediction mode and weights in IBC-CIIP mode, the intra prediction mode and the geometry partitioning mode of IBC-GPM mode, and the like.

In some embodiments, the OBMC is performed on a sample level.

In some embodiments, whether the first prediction signal $pred_C$ or the third prediction signal pred to be the final prediction signal to a sample in a sub-block is determined based on a predicted value of the sample. In this example, for a sample with coordinates (i, j), the first prediction signal is $pred_C(i,j)$, the second prediction signal is $pred_N(i,j)$, and the third prediction signal is pred(i,j). In some embodiments, the difference between $pred_C(i,j)$ and $pred_N(i,j)$ is calculated and used to determine whether the first prediction signal $pred_C(i, j)$ or the third prediction signal pred(i, j) to be the final prediction signal to the sample with coordinates (i, j). If the difference is greater than (or equal to) a threshold, the first prediction signal $pred_C(i,j)$ is determined to be the final prediction signal; if the difference is less than the threshold, the third prediction signal pred(i, j) is determined to be the final prediction signal to the sample, which is obtained by blending the $pred_C(i,j)$ and the $pred_N(i,j)$.

In some embodiments, whether the first prediction signal or the third prediction signal to be the final prediction signal is determined on a block level.

In some embodiments, a block level flag is signaled to indicate whether the first prediction signal or the third prediction signal to be the final prediction signal to a block. In some embodiments, whether to signal the flag is determined by the prediction mode of the current block. For example, if the current block is predicted by IBC-AMVP mode, the flag is signaled to indicate whether the first prediction signal or the third prediction signal to be the final prediction signal; otherwise, the third prediction signal is determined to be the final prediction signal without any signaling.

In some embodiments, the third prediction signal is determined to be the final prediction signal to all blocks predicted by intra TMP mode or IBC mode without any signalling.

In some embodiments, whether the first prediction signal or the third prediction signal to be the final prediction signal to a block is determined based on the number of samples in the block. For example, if the number of samples in a block is greater than or equal to 256, the first prediction signal is determined to be the final prediction signal, and if the number of samples in a block is less than 256, the third prediction signal is determined to be the final prediction signal.

In some embodiments, whether the first prediction signal or the third prediction signal to be the final prediction signal to a block is determined based on the prediction mode of the current block. For example, when the current block is predicted by an IBC-GPM mode, an IBC-CIIP mode, a RR-IBC mode, an IBC-AMVP mode, an Intra TMP fusion mode, the first prediction signal is determined to be the final prediction signal.

In some embodiments, whether the first prediction signal or the third prediction signal to be the final prediction signal to a block is determined based on the type of the current slice. For example, a slice type (e.g., B-slice or I-slice) is determined for the current block, when the block is an I-slice, the first prediction signal is determined to be the final prediction signal to the block.

In some embodiments, whether the first prediction signal or the third prediction signal to be the final prediction signal to a block is determined based on a SPS level flag. In one example, the SPS flag is set to false for screen content sequences, which means OBMC is not performed for screen content sequences, i.e., the first prediction signal is determined to be the final prediction signal to the block.

In some embodiments, whether the first prediction signal or the third prediction signal to be the final prediction signal to a block is determined based on a type of the block. For example, a type of the block (a luma block or a chroma block) is determined, when the block is a chroma block, the first prediction signal is determined to be the final prediction signal to the block.

In some embodiments, when the current block is predicted by an intra prediction mode, that is, there is no block vector for the current block, the OBMC can also be performed, and the $pred_C$ is the prediction signal of the intra prediction mode. The $pred_N$, pred, and the determination for whether to perform the OBMC with the first prediction signal $pred_C$ or the third prediction signal pred can be obtained according to the aforementioned OBMC process.

In some embodiments, the aforementioned embodiments can be freely combined.

In some embodiments, a non-transitory computer-readable storage medium storing a bitstream is also provided. The bitstream can be encoded and decoded according to the disclosed OBMC for Intra mode. In some embodiments, the bitstream includes a block flag indicating whether the first prediction signal or the third prediction signal to be a final prediction signal to a block. In some embodiments, the bitstream includes a SPS level flag indicting whether the first prediction signal or the third prediction signal to be a final prediction signal.

The embodiments may further be described using the following clauses:

1. A method for processing video, comprising:
   receiving a bitstream; and
   decoding, using coded information of the bitstream, one or more pictures,
   wherein the decoding comprises:
   performing overlapped block motion compensation (OBMC) on a block predicted with an intra mode.
2. The method according to clause 1, wherein performing the OBMC on the block predicted with the intra mode further comprises:
   obtaining a first prediction signal based on a first block vector of the block;
   obtaining a second prediction signal based on a second block vector according to a neighboring block;
   generating a third prediction signal according to the first prediction signal and the second prediction signal.
3. The method according to clause 2, wherein the OBMC is performed on a sub-block in one or more boundaries of the block, and the second block vector is a block vector associated with a neighboring sub-block.
4. The method according to clause 3, wherein the one or more boundaries comprise at least one of a top boundary or a left boundary of the block.
5. The method according to clause 3, wherein obtaining the first prediction signal based on the block further comprises:
   performing an intra template matching prediction (Intra TMP) or an intra block copy (IBC) on the block to obtain the first block vector.
6. The method according to clause 3, wherein generating the third prediction signal for the OBMC according to the first prediction signal and the second prediction signal comprises:
   blending the first prediction signal and the second prediction signal to obtain the third prediction signal.
7. The method according to clause 6, wherein blending the first prediction signal and the second prediction signal to obtain the third prediction signal further comprises:
   determining weights based on one of a maximum value of an absolute difference between the first prediction signal and the second prediction signal, an absolute difference between an average value of the first prediction signal and an average value of the second prediction signal, or a sum of absolute differences (SAD) value between the first prediction signal and the second prediction signal.
8. The method according to clause 3, wherein performing the OBMC on the block predicted with the intra mode further comprises:
   merging consecutive sub-blocks; and
   performing the OBMC on the merged sub-blocks.

9. The method according to clause 8, wherein merging the consecutive sub-blocks further comprises:

determining whether neighboring sub-blocks corresponding to the consecutive sub-blocks respectively being in a same block; and when the neighboring sub-blocks being in the same block, merging the consecutive sub-blocks.

10. The method according to clause 8, wherein merging the consecutive sub-blocks further comprises:

determining whether a block vector and prediction mode parameters of each neighboring sub-block corresponding to each of the consecutive sub-blocks are the same;

when the block vector and the prediction mode parameters are the same, merging the consecutive sub-blocks.

11. The method according to clause 3, wherein the second prediction signal is obtained by the second block vector of the neighboring sub-block and prediction parameters of the neighboring sub-block.

12. The method according to clause 3, wherein when the neighboring sub-block is predicted by an intra prediction mode, the method further comprises:

generating the second prediction signal using a stored intra prediction mode of the neighboring sub-block.

13. The method according to clause 12, wherein when the neighboring sub-block is predicted by the intra prediction mode, the method further comprises:

deriving the second block vector by a padding method; and generating the second prediction signal with the second block vector.

14. The method according to clause 13, wherein deriving the second block vector by the padding method further comprises:

when the neighboring sub-block is in a top boundary of the block, and there is no stored block vector for the neighboring sub-block, padding a block vector from left and right adjacent sub-blocks to the neighboring sub-block; or when the neighboring sub-block in a left boundary of the block, and there is no stored block vector for the neighboring sub-block, padding a block vector from top and bottom adjacent sub-blocks of the neighboring sub-block to the neighboring sub-block.

15. The method according to clause 14, wherein deriving the second block vector by the padding method further comprises:

when the neighboring sub-block is in the top boundary of the block, padding prediction parameters from left and right adjacent sub-blocks of the neighboring sub-block to the neighboring sub-block; or when the neighboring sub-block in a left boundary of the block, padding prediction parameters from top and bottom adjacent sub-blocks of the neighboring sub-block to the neighboring sub-block.

16. The method according to clause 3, further comprising:

determining whether the first prediction signal or the third prediction signal to be a final prediction signal on the sub-block.

17. The method according to clause 16, wherein determining whether the first prediction signal or the third prediction signal to be the final prediction signal on the sub-block further comprises:

determining whether a neighboring sub-block of the sub-block is available; and when the neighboring sub-block is not available, determining the first prediction signal to be the final prediction signal.

18. The method according to clause 16, wherein determining whether the first prediction signal or the third prediction signal to be the final prediction signal on the sub-block further comprises:

determining whether the second block vector is available; and when the second block vector is not available, determining the first prediction signal to be the final prediction signal.

19. The method according to clause 16, wherein determining whether the first prediction signal or the third prediction signal to be the final prediction signal on the sub-block is based on a predicted value of samples of the sub-block.

20. The method according to clause 19, wherein determining whether the first prediction signal or the third prediction signal to be the final prediction signal on the sub-block based on the predicted value of samples of the sub-block comprises:

calculating a maximum value of an absolute difference between the first prediction signal and the second prediction signal; and when the maximum value of the absolute difference between the first prediction signal and the second prediction signal is greater than or equal to a threshold value, determining the first prediction signal to be the final prediction signal.

21. The method according to clause 19, wherein determining whether the first prediction signal or the third prediction signal to be the final prediction signal on the sub-block based on the prediction value of samples of the sub-block comprises:

calculating an absolute difference between an average value of the first prediction signal and an average value of the second prediction signal; and when the absolute difference between the average value of the first prediction signal and the second prediction signal is greater than or equal to a threshold value, determining the first prediction signal to be the final prediction signal.

22. The method according to clause 19, wherein determining whether the first prediction signal or the third prediction signal to be the final prediction signal on the sub-block based on the prediction value of samples of the sub-block comprises:

calculating a sum of absolute differences (SAD) between the first prediction signal and the second prediction signal;

when the SAD is greater than or equal to a threshold value, determining the first prediction signal to be the final prediction signal.

23. The method according to clause 16, wherein determining whether the first prediction signal or the third prediction signal to be the final prediction signal on the sub-block is based on a prediction mode of the neighboring sub-block.

24. The method according to clause 23, wherein:

when the sub-block is in a top boundary, determining whether the first prediction signal or the third prediction signal to be the final prediction signal on the sub-block is based on a prediction mode of the top neighboring sub-block; or when the sub-block is in a left boundary, determining whether the first prediction signal or the third prediction signal to be the final prediction signal on the sub-block is based on a prediction mode of the left neighboring sub-block.

25. The method according to clause 24, wherein determining whether the first prediction signal or the third prediction signal to be the final prediction signal on the sub-block further comprises:

when the left neighboring sub-block or top neighboring sub-block is an intra block copy with geometry partitioning (IBC-GPM) mode, a combined intra block copy and intra prediction (IBC-CIIP) mode, a reconstruction-reordered intra block copy (RR-IBC) mode, or an intra template matching prediction (intra TMP) fusion mode, determining the first prediction signal to be the final prediction signal on the sub-block.

26. The method according to clause 2, wherein the OBMC is performed on a sample of a sub-block in one or more boundaries of the block.

27. The method according to clause 26, further comprises:

determining whether the first prediction signal or the third prediction signal to be a final prediction signal on the sample.

28. The method according to clause 27, wherein determining whether the first prediction signal or the third prediction signal to be the final prediction signal is based on a predicted value of the sample of the sub-block.

29. The method according to clause 28, wherein determining whether the first prediction signal or the third prediction signal to be the final prediction signal based on the predicted value of the sample of the sub-block further comprises:

calculating a different between the first prediction signal of the sample and the second prediction signal of the sample; and when the different between a first prediction signal of the sample and the second prediction signal of the sample is greater than or equal to a threshold value, determining the first prediction signal to be the final prediction signal on the sample; or when the different between a first prediction signal of the sample and a second prediction signal of the sample is less than the threshold value, determining the third prediction signal to be the final prediction signal on the sample.

30. The method according to clause 2, further comprising determining whether the first prediction signal or the third prediction signal to be a final prediction signal on a block level.

31. The method according to clause 30, wherein performing the OBMC on the block predicted with the intra mode further comprises:

determining whether the first prediction signal or the third prediction signal to be the final prediction signal based on one of a number of samples in the block, a prediction mode of the block, a slice type of the block, or a type of the block.

32. The method according to clause 31, wherein when determining whether the first prediction signal or the third prediction signal to be the final prediction signal is based on the prediction mode of the block, the method further comprises:

when the block is predicted by one of an intra block copy with geometry partitioning (IBC-GPM) mode, a combined intra block copy and intra prediction (IBC-CIIP) mode, a reconstruction-reordered intra block copy (RR-IBC), an intra block copy with advanced motion vector prediction (IBC-AMVP) mode, or an intra template matching prediction (intra TMP) fusion mode, determining the first prediction signal to be the final prediction signal.

33. The method according to clause 31, wherein when determining whether the first prediction signal or the third prediction signal to be the final prediction signal is based on the slice type of the block, the method further comprises:

determining the slice type of the block; and when the block is an I-slice, determining the first prediction signal to be the final prediction signal.

34. The method according to clause 31, wherein when determining whether the first prediction signal or the third prediction signal to be the final prediction signal based on the type of the block, the method further comprises:

determining the type of the block; and when the block is a chroma block, determining the first prediction signal to be the final prediction signal.

35. The method according to clause 2, further comprising:

decoding a flag indicating whether the first prediction signal or the third prediction signal to be a final prediction signal.

36. The method according to clause 35, wherein the flag is a sequence parameter set (SPS) flag.

37. The method according to clause 35, wherein the flag is signaled determined based on a prediction mode of the block.

38. The method according to clause 37, wherein determining whether the first prediction signal or the third prediction signal to be the final prediction signal further comprises:

determining whether the block is predicted by an intra block copy with advanced motion vector prediction (IBC-AMVP) mode;

when the block is predicted by the IBC-AMVP mode, decoding the flag; and determining the final prediction signal according to the flag; and when the block is not predicted by the IBC AMVP mode, determining the third prediction signal to be the final prediction signal.

39. The method according to clause 2, further comprising:

blending the first prediction signal and the third prediction signal to obtain a fourth prediction signal; and determining the fourth prediction signal to be a final prediction signal.

40. The method according to clause 39, wherein blending the first prediction signal and the third prediction signal to obtain a fourth prediction signal further comprises:

determining a weight the first prediction signal based on a sum of absolute differences (SAD) between the first prediction signal and the second prediction signal; and when the SAD is greater than or equal to a threshold value, determining the weight for the first prediction signal to be 1; or when the SAD is less than the threshold value, determining the weight to be a result of dividing the SAD by the threshold value.

41. The method according to clause 1, wherein when the block is predicted by an intra prediction mode, the method further comprises:

obtaining a first prediction signal to be a prediction signal of the intra prediction mode;

obtaining a second prediction signal based on a second block vector according to a neighboring block; and generating a third prediction signal according to the first prediction signal and the second prediction signal.

42. A method of encoding a video sequence into a bitstream, the method comprising: receiving a video sequence;

encoding one or more pictures of the video sequence; and generating a bitstream, wherein the encoding comprises:

performing overlapped block motion compensation (OBMC) on a block predicted with an intra mode.

43. A non-transitory computer readable storage medium storing a bitstream of a video for processing according to operations comprising:

performing overlapped block motion compensation (OBMC) on a block predicted with an intra mode.

In some embodiments, a non-transitory computer-readable storage medium including instructions is also provided, and the instructions may be executed by a device (such as the disclosed encoder and decoder), for performing the above-described methods. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same. The device may include one or more processors (CPUs), an input/output interface, a network interface, and/or a memory.

It should be noted that, the relational terms herein such as "first" and "second" are used only to differentiate an entity or operation from another entity or operation, and do not require or imply any actual relationship or sequence between these entities or operations. Moreover, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items.

As used herein, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

It is appreciated that the above-described embodiments can be implemented by hardware, or software (program codes), or a combination of hardware and software. If implemented by software, it may be stored in the above-described computer-readable media. The software, when executed by the processor can perform the disclosed methods. The computing units and other functional units described in this disclosure can be implemented by hardware, or software, or a combination of hardware and software. One of ordinary skill in the art will also understand that multiple ones of the above-described modules/units may be combined as one module/unit, and each of the above-described modules/units may be further divided into a plurality of sub-modules/sub-units.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

In the drawings and specification, there have been disclosed exemplary embodiments. However, many variations and modifications can be made to these embodiments. Accordingly, although specific terms are employed, they are used in a generic and descriptive sense only and not for purposes of limitation.

What is claimed is:

1. A method for processing video, comprising:

receiving a bitstream; and decoding, using coded information of the bitstream, one or more pictures, wherein the decoding comprises:

performing overlapped block motion compensation (OBMC) on a block predicted with an intra mode using a block vector, wherein the block vector corresponds to a position in a current picture, wherein the OBMC is performed on a sub-block in one or more boundaries of the block, and performing the OBMC on the block predicted with the intra mode further comprises:

obtaining a first prediction signal based on a first block vector of the block;

obtaining a second prediction signal based on a second block vector according to a neighboring block, wherein the second block vector is a block vector associated with a neighboring sub-block; and generating a third prediction signal according to the first prediction signal and the second prediction signal;

wherein when the neighboring sub-block is predicted by an intra prediction mode, generating the second prediction signal using a stored intra prediction mode of the neighboring sub-block.

2. The method according to claim 1, wherein obtaining the first prediction signal based on the block further comprises:

performing an intra template matching prediction (Intra TMP) or an intra block copy (IBC) on the block to obtain the first block vector.

3. The method according to claim 1, wherein the second prediction signal is obtained by the second block vector of the neighboring sub-block and prediction parameters of the neighboring sub-block.

4. The method according to claim 1, wherein when the block is predicted by an intra prediction mode, the method further comprises:

obtaining a first prediction signal to be a prediction signal of the intra prediction mode;

obtaining a second prediction signal based on a second block vector according to a neighboring block; and generating a third prediction signal according to the first prediction signal and the second prediction signal.

5. A method of encoding a video sequence, the method comprising:

receiving a video sequence; and encoding the video sequence by performing overlapped block motion compensation (OBMC) on a block predicted with an intra mode using a block vector, wherein the block vector corresponds to a position in a current picture, wherein the OBMC is performed on a sub-block in one or more boundaries of the block, and performing the OBMC on the block predicted with the intra mode further comprises:

obtaining a first prediction signal based on a first block vector of the block;

obtaining a second prediction signal based on a second block vector according to a neighboring block, wherein the second block vector is a block vector associated with a neighboring sub-block; and generating a third prediction signal according to the first prediction signal and the second prediction signal;

wherein when the neighboring sub-block is predicted by an intra prediction mode, generating the second prediction signal using a stored intra prediction mode of the neighboring sub-block.

6. The method according to claim 5, wherein obtaining the first prediction signal based on the block further comprises:

performing an intra template matching prediction (Intra TMP) or an intra block copy (IBC) on the block to obtain the first block vector.

7. The method according to claim 5, wherein the second prediction signal is obtained by the second block vector of the neighboring sub-block and prediction parameters of the neighboring sub-block.

8. The method according to claim 5, wherein when the block is predicted by an intra prediction mode, the method further comprises:

obtaining a first prediction signal to be a prediction signal of the intra prediction mode;

obtaining a second prediction signal based on a second block vector according to a neighboring block; and generating a third prediction signal according to the first prediction signal and the second prediction signal.

9. The method according to claim 5, further comprising:

storing the bitstream that is generated based on the encoding.

10. A method for transmitting a bitstream, the method comprising:

receiving a video sequence;

encoding the video sequence by:

performing overlapped block motion compensation (OBMC) on a block predicted with an intra mode using a block vector, wherein the block vector corresponds to a position in a current picture; and transmitting the bitstream that is generated based on the encoding to an image decoding apparatus;

wherein the OBMC is performed on a sub-block in one or more boundaries of the block, and performing the OBMC on the block predicted with the intra mode further comprises:

obtaining a first prediction signal based on a first block vector of the block;

obtaining a second prediction signal based on a second block vector according to a neighboring block, wherein the second block vector is a block vector associated with a neighboring sub-block; and generating a third prediction signal according to the first prediction signal and the second prediction signal;

wherein when the neighboring sub-block is predicted by an intra prediction mode, generating the second prediction signal using a stored intra prediction mode of the neighboring sub-block.

11. The method according to claim 10, wherein the encoding further comprises:

performing an intra template matching prediction (Intra TMP) or an intra block copy (IBC) on the block to obtain the first block vector.

12. The method according to claim 10, wherein the second prediction signal is obtained by the second block vector of the neighboring sub-block and prediction parameters of the neighboring sub-block.

13. The method according to claim 10, wherein when the block is predicted by an intra prediction mode, the encoding further comprises:

obtaining a first prediction signal to be a prediction signal of the intra prediction mode;

obtaining a second prediction signal based on a second block vector according to a neighboring block; and generating a third prediction signal according to the first prediction signal and the second prediction signal.

* * * * *